US012682855B2

(12) United States Patent
No et al.

(10) Patent No.: US 12,682,855 B2
(45) Date of Patent: Jul. 14, 2026

(54) DRIVING CIRCUIT

(71) Applicant: Samsung Display Co., LTD., Yongin-si (KR)

(72) Inventors: Sangyong No, Yongin-si (KR); Kyungho Kim, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 19/021,550

(22) Filed: Jan. 15, 2025

(65) Prior Publication Data

US 2025/0273163 A1 Aug. 28, 2025

(30) Foreign Application Priority Data

Feb. 27, 2024 (KR) ........................ 10-2024-0028153

(51) Int. Cl.
*G09G 3/3266* (2016.01)

(52) U.S. Cl.
CPC ... *G09G 3/3266* (2013.01); *G09G 2310/0286* (2013.01); *G09G 2310/08* (2013.01); *G09G 2330/021* (2013.01)

(58) Field of Classification Search
CPC ......... G09G 3/3266; G09G 2310/0286; G09G 2310/08; G09G 2330/021
See application file for complete search history.

(56) References Cited

U.S. PATENT DOCUMENTS 8,587,508 B2 * 11/2013 Iwase ..................... G11C 19/28 377/79
8,633,888 B2 * 1/2014 Kim ....................... G09G 3/344 377/79
9,780,157 B2 10/2017 Kwon et al.
9,824,771 B2 11/2017 Cho et al.
10,152,910 B2 12/2018 Yoon et al.
10,638,086 B2 4/2020 Ahn et al.
11,417,263 B2 * 8/2022 Feng .................... G09G 3/2092
12,380,857 B2 * 8/2025 In ......................... G09G 3/3258
(Continued)

FOREIGN PATENT DOCUMENTS

CN 112927643 B 4/2022
KR 1020170080900 A 7/2017
(Continued)

*Primary Examiner* — Grant Sitta
(74) *Attorney, Agent, or Firm* — CANTOR COLBURN LLP

(57) ABSTRACT

A driving circuit includes: an output circuit connected between a first terminal and a second terminal, and for outputting an output signal of a first voltage level or a second voltage level according to voltage levels of a first node and a second node, and a control circuit connected to the output circuit and an input terminal, and for controlling the voltage levels of the first node and the second node. The control circuit includes: a first transistor connected between the input terminal and a third node; a second transistor connected between the third node and a fourth node; a third transistor connected between the fourth node and the first node; and an inverter connected between the first terminal and the second terminal and for controlling a voltage of the second node to a voltage level obtained by inverting the voltage level of the first node.

16 Claims, 40 Drawing Sheets

(56) References Cited

U.S. PATENT DOCUMENTS

| | | | | |
|---|---|---|---|---|
| 2004/0189584 | A1* | 9/2004 | Moon | G11C 19/184 345/100 |
| 2010/0134234 | A1* | 6/2010 | Liao | G11C 19/28 377/54 |
| 2017/0110050 | A1* | 4/2017 | Park | G09G 3/3208 |
| 2018/0301100 | A1* | 10/2018 | Li | G09G 3/3674 |
| 2022/0084470 | A1* | 3/2022 | Park | H10K 59/1213 |
| 2022/0199032 | A1* | 6/2022 | Hong | G11C 19/28 |
| 2022/0335878 | A1 | 10/2022 | Song et al. | |
| 2023/0031695 | A1* | 2/2023 | Ma | H01L 25/18 |
| 2024/0386838 | A1 | 11/2024 | Oh et al. | |

FOREIGN PATENT DOCUMENTS

| | | | |
|---|---|---|---|
| KR | 101967378 | B1 | 4/2019 |
| KR | 101992158 | B1 | 9/2019 |
| KR | 102244015 | B1 | 4/2021 |
| KR | 1020220074700 | A | 6/2022 |
| KR | 1020220087685 | A | 6/2022 |
| KR | 1020220142566 | A | 10/2022 |
| KR | 102471098 | B1 | 11/2022 |
| KR | 1020230020074 | A | 2/2023 |
| KR | 102518387 | B1 | 4/2023 |
| KR | 1020230051027 | A | 4/2023 |
| KR | 102556084 | B1 | 7/2023 |
| KR | 1020240166065 | A | 11/2024 |

* cited by examiner

DRIVING CIRCUIT

This application claims priority to Korean Patent Application No. 10-2024-0028153, filed on Feb. 27, 2024, and all the benefits accruing therefrom under 35 U.S.C. § 119, the content of which in its entirety is herein incorporated by reference.

BACKGROUND

1. Field

One or more embodiments relate to a display apparatus, and more particularly, to a driving circuit configured to output gate signals and a display apparatus including the driving circuit.

2. Description of the Related Art

A display apparatus includes a pixel area, a gate driving circuit, a data driving circuit, a controller, and the like, the pixel area including a plurality of pixels. The gate driving circuit includes stages connected to gate lines, and the stages are configured to supply gate signals to the gate lines connected to the stages in response to signals received from the controller.

SUMMARY

One or more embodiments include a driving circuit configured to stably output gate signals and a display apparatus including the driving circuit. Technical aspects to be achieved by an embodiment are not limited to the technical aspects mentioned above, and other technical aspects that are not mentioned will be clearly understood by those of ordinary skill in the art from the description of the disclosure.

Additional aspects will be set forth in part in the description which follows and, in part, will be apparent from the description, or may be learned by practice of the presented embodiments of the disclosure.

According to one or more embodiments, a driving circuit includes a plurality of stages, where each of the plurality of stages includes: an output circuit connected between a first terminal to which a first voltage is input, and a second terminal to which a second voltage is input, and configured to output an output signal of a first voltage level or a second voltage level according to voltage levels of a first node and a second node; and a control circuit connected to the output circuit and an input terminal to which a start signal is input, and configured to control the voltage levels of the first node and the second node. The control circuit includes: a first transistor connected between the input terminal and a third node and including a gate connected to a third terminal to which a third voltage is input, a second transistor connected between the third node and a fourth node and including a gate connected to a clock terminal to which a clock signal is input, a third transistor connected between the fourth node and the first node and including a gate connected to the third terminal, and an inverter connected between the first terminal and the second terminal and configured to control a voltage of the second node to a voltage level obtained by inverting the voltage level of the first node.

The second voltage may be less than the first voltage, and the third voltage may be less than the first voltage and greater than the second voltage.

The second transistor may be an N-channel transistor, and the first transistor and the third transistor may be P-channel transistors.

The clock signal may be a signal of which a high-level voltage less than the first voltage, and a low-level voltage greater than the second voltage alternate and the low-level voltage of the clock signal may be the third voltage.

A clock signal input to clock terminals of even-numbered stages among the plurality of stages may be a signal that is phase-shifted by a ½ cycle compared to a clock signal input to clock terminals of odd-numbered stages.

The inverter may include a fourth transistor connected between the first terminal and the second node and including a gate connected to the first node or the fourth node, and a fifth transistor connected between the second node and the second terminal and including a gate connected to the first node or the fourth node.

The fourth transistor may be a P-channel transistor, and the fifth transistor may be an N-channel transistor.

The second transistor may further include a back gate to which a fourth voltage less than the third voltage is input.

The output circuit may include: a sixth transistor connected between the second terminal and an output terminal from which the output signal is output and including a gate connected to the first node; a seventh transistor connected between the first terminal and the output terminal and including a gate connected to the second node; and a capacitor connected between the first node and the output terminal.

Each of the plurality of stages may further include an eighth transistor connected between the first terminal and the fourth node and including a gate connected to a reset terminal to which a reset signal is input.

According to one or more embodiments, a driving circuit includes: a plurality of stages, wherein each of the plurality of stages includes: an output circuit connected between a first terminal to which a first voltage is input, and a second terminal to which a second voltage is input, and configured to output an output signal of a first voltage level or a second voltage level according to a voltage level of a first node and a second node; and a control circuit connected to the output circuit and an input terminal to which a start signal is input, and configured to control the voltage levels of the first node and the second node. The control circuit includes: a first transistor connected between the input terminal and a third node and including a gate connected to a third terminal to which a third voltage is input, a second transistor connected between the third node and a fourth node and including a gate connected to a clock terminal to which a clock signal is input, a third transistor connected between the fourth node and a fifth node and including a gate connected to the third terminal, a fourth transistor connected between the fifth node and the first node and including a gate connected to a fourth terminal to which a fourth voltage is input, and an inverter connected between the first terminal and the second terminal and configured to control a voltage of the second node to a voltage level obtained by inverting the voltage level of the first node.

The second voltage may be less than the first voltage, the third voltage may be less than the first voltage, and the fourth voltage may be less than the third voltage and greater than the second voltage.

The first transistor and the third transistor may be N-channel transistors, and the second transistor and the fourth transistor may be P-channel transistors.

The clock signal may be a signal of which a high-level voltage less than the first voltage and a low-level voltage greater than the second voltage alternate, the high-level voltage of the clock signal may be the third voltage, and the low-level voltage of the clock signal may be the fourth voltage.

A clock signal input to clock terminals of even-numbered stages among the plurality of stages may be a signal that is phase-shifted by ½ cycle compared to a clock signal input to clock terminals of odd-numbered stages.

The inverter may include a fifth transistor connected between the first terminal and the second node and including a gate connected to the first node or the fifth node, and a sixth transistor connected between the second node and the second terminal and including a gate connected to the first node or the fifth node.

The fifth transistor may be a P-channel transistor, and the sixth transistor may be an N-channel transistor.

The first transistor and the third transistor may further include a back gate to which a fifth voltage less than the fourth voltage is input.

The output circuit may include a seventh transistor connected between the second terminal and an output terminal from which the output signal is output and including a gate connected to the first node; an eighth transistor connected between the first terminal and the output terminal and including a gate connected to the second node; and a capacitor connected between the first node and the output terminal.

Each of the plurality of stages may further include a ninth transistor connected between the first terminal and the fifth node and including a gate connected to a reset terminal to which a reset signal is input.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
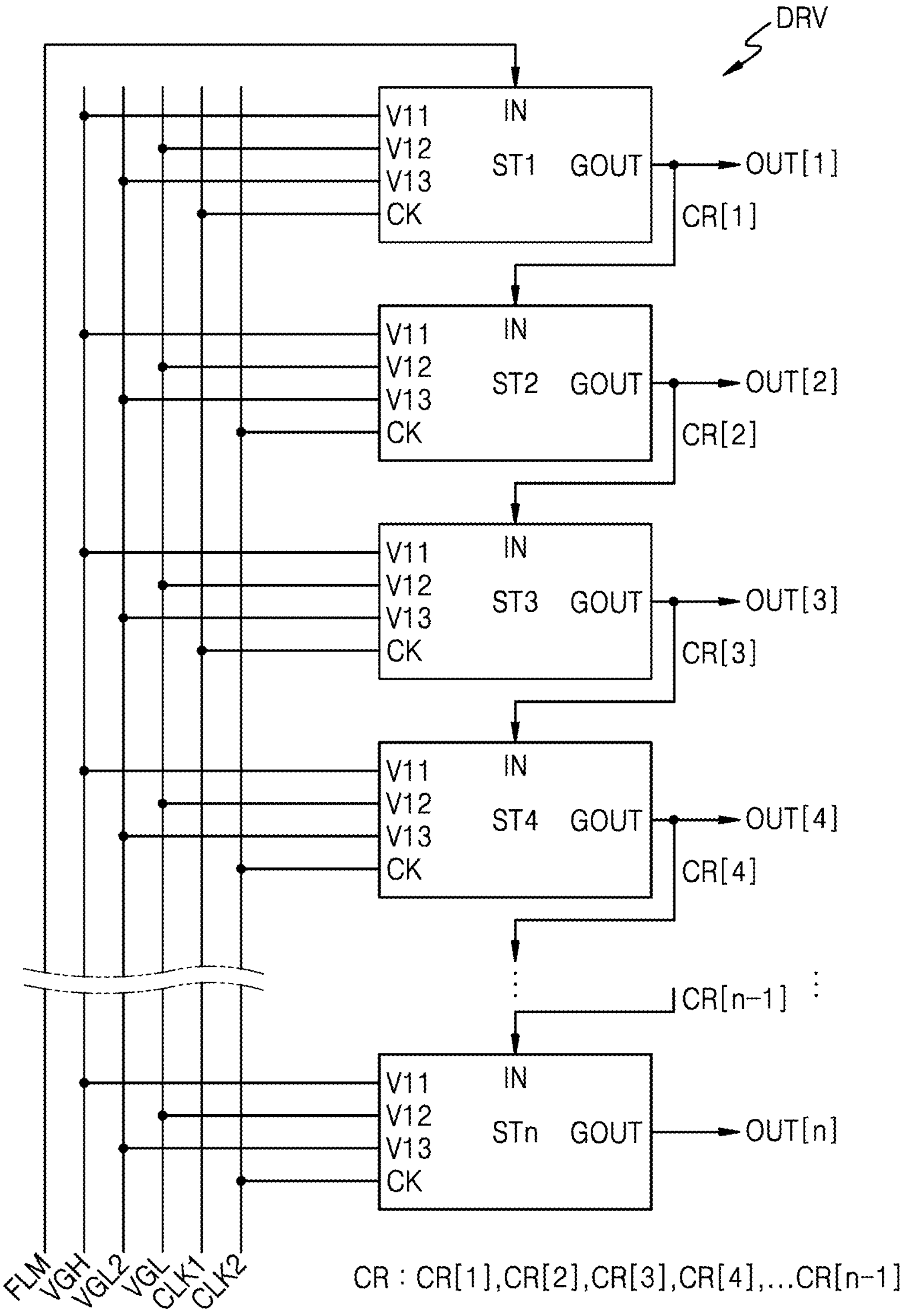
FIG. 1 is a schematic view of a driving circuit according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Throughout the disclosure, the expression "at least one of a, b or c" indicates only a, only b, only c, both a and b, both a and c, both b and c, all of a, b, and c, or variations thereof.

As the disclosure allows for various changes and numerous embodiments, certain embodiments will be illustrated in the drawings and described in the written description. Effects and features of the disclosure, and methods for achieving them will be clarified with reference to embodiments described below in detail with reference to the drawings. However, the disclosure is not limited to the following embodiments and may be embodied in various forms.

While such terms as "first" and "second" may be used to describe various elements, such elements must not be limited to the above terms. The above terms are used to distinguish one element from another.

The singular forms "a," "an," and "the" as used herein are intended to include the plural forms as well unless the context clearly indicates otherwise.

It will be understood that the terms "comprise," "comprising," "include" and/or "including" as used herein specify the presence of stated features or elements but do not preclude the addition of one or more other features or elements.

Sizes of elements in the drawings may be exaggerated or reduced for convenience of explanation. As an example, the size and thickness of each element shown in the drawings are arbitrarily represented for convenience of description, and thus, the present disclosure is not necessarily limited thereto.

In the present specification, "A and/or B" means A or B, or A and B. In the present specification, "at least one of A and B" means A or B, or A and B.

In embodiments below, when it is described that X is connected to Y, X may be physically connected to Y, X may be functionally connected to Y, or X may be electrically connected to Y. In addition, when it is described that X is connected to Y, X may be directly connected to Y, or X may be indirectly connected to Y with another element therebetween. Here, X and Y may be elements (e.g., apparatuses, elements, circuits, wirings, electrodes, terminals, layers, films, regions, and the like).

As an example, in the case where X and Y are electrically connected to each other, it may include the case where X and Y are directly electrically connected to each other, and/or the case where X and Y are indirectly electrically connected to each other with another element therebetween. The case where X is directly electrically connected to Y may include the case where at least one element (e.g., a switch, a transistor, a capacitance element, an inductor, a resistance element, a diode, and the like) enabling electrical connection between X and Y is connected between X and Y. Accordingly, X and Y are not limited to preset connection relationships and connection relationships shown and made in the drawings and the detailed description, but may include connection relationships other than the connection relationships shown and made in the drawings and the detailed description.

In embodiments below, "ON" used in association with an element state may denote an active state of an element, and "OFF" may denote an inactive state of an element. "ON" used in association with a signal received by an element may denote a signal activating the element, and "OFF" may denote a signal inactivating the element. An element may be activated by a high-level voltage or a low-level voltage. As an example, a P-channel transistor (a P-type transistor) may be activated by a low-level voltage, and an N-channel transistor (an N-type transistor) may be activated by a high-level voltage. Accordingly, it should be understood that "ON" voltages for a P-channel transistor and an N-channel transistor are opposite (low vs. high) voltage levels. Hereinafter, a voltage that activates (turns on) a transistor is referred to as a gate on-voltage, and a voltage that inactivates (turns off) a transistor is referred to as a gate off-voltage.

Figure 2:
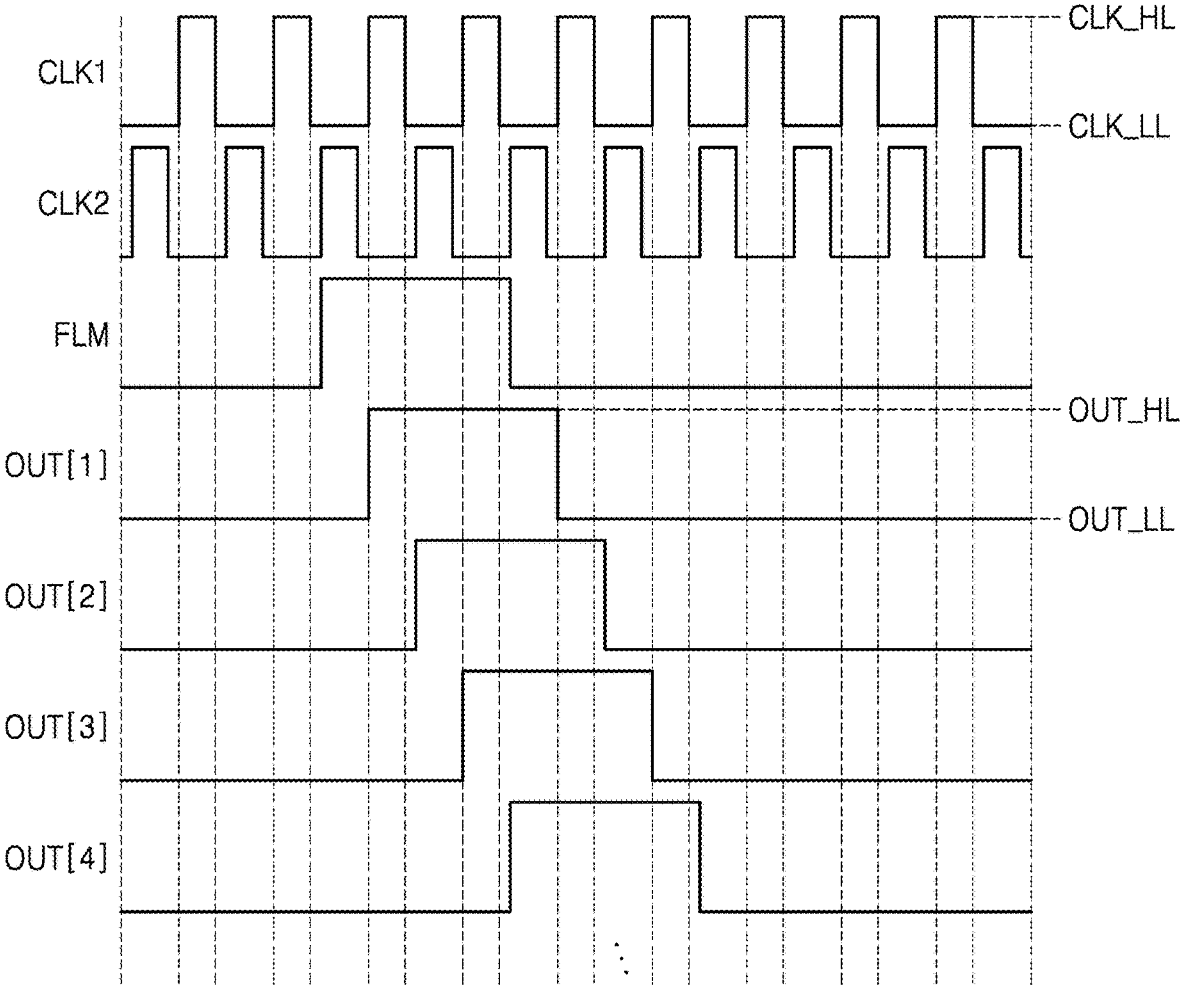
FIG. 2 is a schematic view of input/output signals of a driving circuit according to an embodiment.

FIG. 1 is a schematic view of a driving circuit DRV according to an embodiment. FIG. 2 is a schematic view of input/output signals of the driving circuit DRV according to an embodiment.

Referring to FIG. 1, the driving circuit DRV according to an embodiment may include a plurality of stages ST1 to STn. The plurality of stages ST1 to STn may be configured to sequentially output the output signals OUT[1], OUT[2], OUT[3], OUT[4], . . . , OUT[n], respectively.

The stages ST1 to STn may each be connected to a signal line. Each of the stages ST1 and STn may receive at least one clock signal and at least one voltage signal, generate an output signal OUT, and transmit the output signal OUT to a signal line connected thereto. The stages ST1 to STn−1 may be configured to generate carry signals CR[1], CR[2], CR[3], CR[4], . . . , CR[n−1], respectively, and output the same to a next stage. In an embodiment, the carry signals CR[1], CR[2], CR[3], CR[4], . . . , CR[n−1] may be output signals (hereinafter, referred to as previous output signals) output by the previous stage.

Each of the stages ST1 to STn may include a plurality of terminals to or from which a plurality of signals are input or output. The plurality of signals may include a clock signal and a voltage signal. The plurality of terminals may include an input terminal IN, a first voltage input terminal V11, a second voltage input terminal V12, a third voltage input terminal V13, a clock terminal CK, and an output terminal GOUT.

A start signal may be input (transmitted) to the input terminal IN. The plurality of stages ST1 to STn may be configured to output the output signals OUT[1], OUT[2], OUT[3], OUT[4], . . . , OUT[n] in response to a start signal, respectively. The start signal may be an external signal FLM or the carry signals CR[1], CR[2], CR[3], CR[4], . . . , CR[n−1]. An external signal FLM as a start signal may be input to an input terminal IN of the first stage ST1, and a previous output signal may be input as a start signal to an input terminal IN of each of the second to n-th stages ST2 to STn. The previous stage may be a stage positioned before at least one previous stage from the current stage. FIG. 1 shows an example in which the previous stage is an immediately preceding previous stage. As an example, a third output signal OUT[3] output from the third stage ST3 may be input as a carry signal and a start signal to an input terminal IN of the fourth stage ST4.

A first voltage VGH may be input to a first voltage input terminal V11, a second voltage VGL may be input to a second voltage input terminal V12, and a third voltage VGL2 may be input to a third voltage input terminal V13. The second voltage VGL may be a voltage less than the first voltage VGH. The third voltage VGL2 may be less than the first voltage VGH and greater than the second voltage VGL. A voltage level of the second voltage VGL may be less than a voltage level of the first voltage VGH. A voltage level of the third voltage VGL2 may be between a voltage level of the first voltage VGH and a voltage level of the second voltage VGL. The first voltage VGH may be denoted by a high-level voltage, and the second voltage VGL and the third voltage VGL2 may be denoted by low-level voltages. In an embodiment, although the first voltage VGH may be about 6.5 V, the second voltage VGL may be about −9.5 V, and the third voltage VGL2 may be about −7 V, the embodiment is not limited thereto.

A clock signal CLK may be input to the clock terminal CK. A clock signal CLK may include a first clock signal CLK1 and a second clock signal CLK2. A first clock signal CLK1 or a second clock signal CLK2 may be input to the clock terminal CK. In an embodiment, a first clock signal CLK1 may be input to a clock terminal CK of the odd numbered stages ST1, ST3, . . . , and a second clock signal CLK2 may be input to a clock terminal CK of the even numbered stages ST2, ST4, . . . . In an embodiment, a second clock signal CLK2 may be input to a clock terminal CK of the odd numbered stages ST1, ST3, . . . , and a first clock signal CLK1 may be input to a clock terminal CK of the even numbered stages ST2, ST4, . . . .

As shown in FIG. 2, a first clock signal CLK1 and a second clock signal CLK2 may be square wave signals in which a high-level voltage and a low-level voltage repeat. In an embodiment, a first clock signal CLK1 and a second clock signal CLK2 may be square wave signals in which a high-level voltage CLK_HL less than the first voltage VGH and a low-level voltage CLK_LL greater than the second voltage VGL repeat. In an embodiment, the low-level voltage CLK_LL of a clock signal CLK may be the third voltage VGL2. In an embodiment, although the high-level voltage CLK_HL of a clock signal CLK may be about 4 V, and the low-level voltage CLK_LL of a clock signal CLK may be about −7 V, the embodiment is not limited thereto.

A first clock signal CLK1 and a second clock signal CLK2 may be signals having the same waveform with a shifted phase. As an example, a second clock signal CLK2 may have the same waveform as a first clock signal CLK1 and be input with a phase shifted (phase-delayed) by a preset interval. The second clock signal CLK2 may be shifted by a half cycle from the first clock signal CLK1. In an embodiment, in a first clock signal CLK1 and a second clock signal CLK2, a duration in which a high-level voltage is maintained during one cycle may be equal to a duration in which a low-level voltage is maintained. In an embodiment, in a first clock signal CLK1 and a second clock signal CLK2, a duration in which a high-level voltage is maintained during one cycle may be less than a duration in which a low-level voltage is maintained.

An output signal may be output from the output terminal GOUT. As shown in FIG. 2, output signals OUT[1], OUT [2], OUT[3], OUT[4], . . . , OUT[n] output from the output terminal GOUT of the stages ST1 to STn may be sequentially shifted by a preset interval. In an embodiment, the stages ST1 to STn may be configured to sequentially shift output signals OUT[1], OUT[2], OUT[3], OUT[4], . . . , OUT[n] of a high-level voltage by a ½ cycle of a clock signal and output the same. In an embodiment, a high-level voltage OUT_HL and a low-level voltage OUT_LL of output signals may be the first voltage VGH and the second voltage VGL, respectively.

In an embodiment, a change width of a high-level voltage CLK_HL and a low-level voltage CLK_LL of a clock signal CLK may be less than a change width of a high-level voltage OUT_HL and a low-level voltage OUT_LL of an output signal OUT. Accordingly, an increase in power consumption occurring due to a capacitance and the like formed between clock lines may be effectively reduced.

Figure 3:
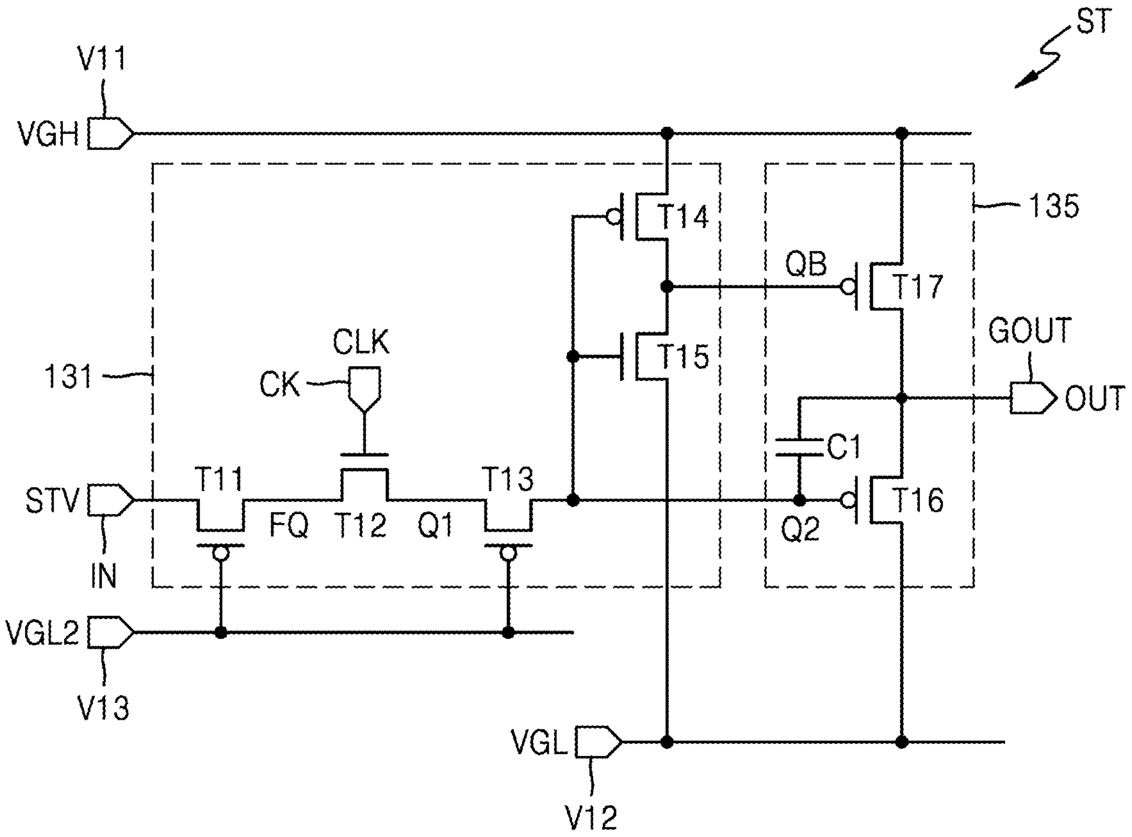
FIGS. 3 and 4 are schematic views showing an example of a stage included in the driving circuit of FIG. 1.
Figure 4:
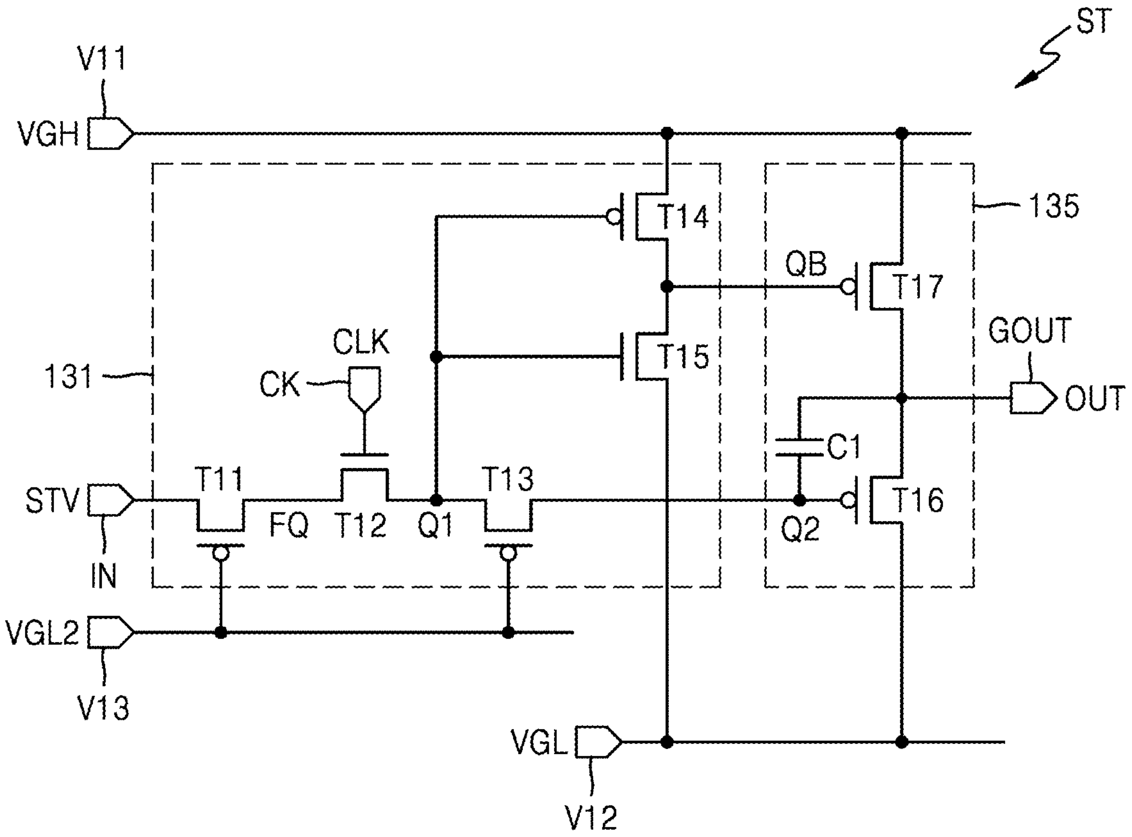
Figure 5:
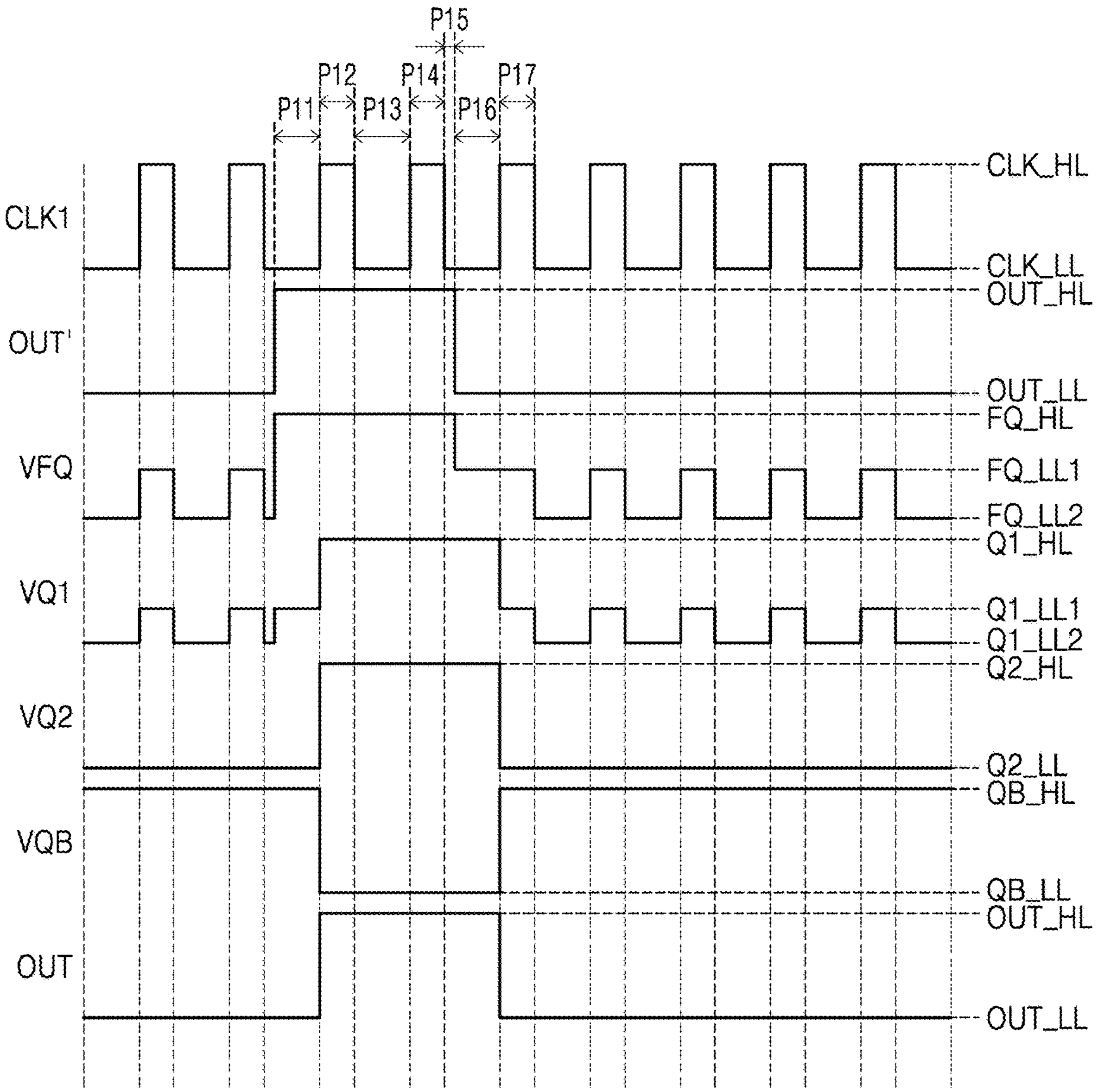
FIG. 5 is a timing diagram to explain driving of the stage of FIG. 3.

FIGS. 3 and 4 are schematic views showing an example of a stage ST included in the driving circuit of FIG. 1. FIG. 5 is a timing diagram to explain driving of the stage ST of FIG. 3.

Referring to FIGS. 3 and 4, the stage ST may include a control circuit 131 and an output circuit 135. Each of the control circuit 131 and the output circuit 135 may include at least one transistor. In an embodiment, the at least one transistor may include an N-channel transistor and/or a P-channel transistor. In an embodiment, impurity conduction type of a second transistor T12 and a fifth transistor T15 of the stage ST may be opposite to an impurity conduction type of the remaining transistors. As an example, the second transistor T12 and the fifth transistor T15 may be N-channel transistors, and a first transistor T11, a third transistor T13, a fourth transistor T14, a sixth transistor T16, and a seventh transistor T17 may be P-channel transistors.

An N-channel transistor may be an oxide transistor. The oxide transistor may include an oxide semiconductor, and the oxide semiconductor is a Zn-oxide-based material and may include a Zn oxide, an In—Zn oxide, a Ga—In—Zn oxide, and/or the like. In an embodiment, the oxide semiconductor may be an In—Ga—Zn—O ("IGZO") semiconductor. In an embodiment, the oxide semiconductor may be an In—Sn—Ga—Zn—O ("ITGZO") semiconductor. As an example, the oxide transistor may be a low temperature polycrystalline oxide silicon ("LTPS") thin-film transistor. A gate-on voltage of the N-channel transistor may be a high-level voltage, and a gate-off voltage of the N-channel transistor may be a low-level voltage.

The P-channel transistor may be a silicon transistor. The silicon transistor may include a silicon semiconductor, and the silicon semiconductor may include amorphous silicon, polycrystalline silicon, and/or the like. As an example, the silicon transistor may be a low temperature polycrystalline silicon (LTPS) thin-film transistor. A gate-on voltage of the P-channel transistor may be a low-level voltage, and a gate-off voltage of the P-channel transistor may be a high-level voltage.

The control circuit 131 may be configured to control the voltages of a first node Q2 and a second node QB in response to a signal input to an input terminal IN. As an example, the control circuit 131 may be configured to control the voltages of the first node Q2 and the second node QB in response to a start signal STV (e.g., an external signal FLM or a carry signal CR (see FIG. 1)). In an embodiment, a carry signal CR may be a previous output signal OUT' (see FIG. 5). The control circuit 131 may include the first to fifth transistors T11 to T15.

The first to third transistors T11 to T13 may be connected between the input terminal IN and the first node Q2. For convenience of description, hereinafter, a node between the first transistor T11 and the second transistor T12 is referred to as a third node FQ, and a node between the second transistor T12 and the third transistor T13 is referred to as a fourth node Q1.

The first transistor T11 may be connected between the input terminal IN and the third node FQ. A gate of the first transistor T11 may be connected to a third voltage input terminal V13. The first transistor T11 may be turned on by a third voltage VGL2 input to the third voltage input terminal V13 and be configured to transmit a start signal STV to the third node FQ. When a clock signal CLK of a low level is input to a gate of the second transistor T12, the first transistor T11 may prevent the second transistor T12 from being turned on by a low level of a start signal STV.

The second transistor T12 may be connected between the third node FQ and the fourth node Q1. A gate of the second transistor T12 may be connected to a clock terminal CK. The second transistor T12 may be controlled to be turned on and turned off according to the voltage of the third node FQ, the voltage of the fourth node Q1, and the voltage of a clock signal CLK input to the clock terminal CK, and be configured to transmit a signal transmitted to the third node FQ to the fourth node Q1 when turned on. A clock signal CLK may be a first clock signal CLK1 or a second clock signal CLK2. The second transistor T12 may be configured to control electrical connection between the third node FQ and the fourth node Q1. The second transistor T12 may disconnect the third node FQ from the fourth node Q1 such that the first node Q2 and the fourth node Q1 are upward bootstrapped.

The third transistor T13 may be connected between the fourth node Q1 and the first node Q2. A gate of the third transistor T13 may be connected to the third voltage input terminal V13. The third transistor T13 may be configured to be turned on or turned off according to the voltage of the fourth node Q1, the voltage of the first node Q2, and the third voltage VGL2 input to the third voltage input terminal V13, and configured to transmit a signal transmitted to the fourth node Q1 to the first node Q2 or transmit a signal of the first node Q2 to the fourth node Q1 when turned on. The third transistor T13 may be configured to control electrical connection between the fourth node Q1 and the first node Q2. The third transistor T13 may disconnect the fourth node Q1 from the first node Q2 such that the first node Q2 is downward bootstrapped. When the voltage of the first node Q2 is a low level and a voltage VQ1 of the fourth node Q1 is less than the third voltage VGL2, the third transistor T13 may be turned off and the voltage VQ2 of the first node Q2 may not be influenced by the shaking of the voltage VQ1 of the fourth node Q1.

The fourth transistor T14 may be connected between the first voltage input terminal V11 and the second node QB. In an embodiment, as shown in FIG. 3, a gate of the fourth transistor T14 may be connected to the first node Q2. In an embodiment, as shown in FIG. 4, a gate of the fourth transistor T14 may be connected to the fourth node Q1. When the voltage VQ2 of the first node Q2 or the fourth node Q1 is a low level, the fourth transistor T14 may be turned on and configured to transmit the first voltage VGH input to the first voltage input terminal V11 to the second node QB. Due to the fourth transistor T14, the voltage level of the voltage of the second node QB may be opposite to the voltage level of the voltage of the fourth node Q1.

The fifth transistor T15 may be connected between the second node QB and the second voltage input terminal V12. In an embodiment, as shown in FIG. 3, a gate of the fifth transistor T15 may be connected to the first node Q2. In an embodiment, as shown in FIG. 4, a gate of the fifth transistor T15 may be connected to the fourth node Q1. When the voltage of the first node Q2 or the fourth node Q1 is a high level, the fifth transistor T15 may be turned on and configured to transmit the second voltage VGL input to the second voltage input terminal V12 to the second node QB. Due to the fifth transistor T15, the voltage level of the voltage of the second node QB may be opposite to the voltage level of the voltage of the fourth node Q1.

The fourth transistor T14 and the fifth transistor T15 may be configured to control the voltage level of the voltage of the second node QB according to the voltage level of the voltage of the first node Q2 or the fourth node Q1 and may serve as an inverter or a level shifter.

The output circuit 135 may be connected between the first voltage input terminal V11 and the second voltage input terminal V12. The output circuit 135 may be configured to output an output signal OUT of a high-level voltage or a low-level voltage according to the voltage level of the first node Q2 or the second node QB. The output circuit 135 may include the sixth transistor T16 and the seventh transistor T17. The output circuit 135 may further include a capacitor C1.

The sixth transistor T16 may be connected between the output terminal GOUT and the second voltage input terminal V12. A gate of the sixth transistor T16 may be connected to the first node Q2. The sixth transistor T16 may be a pull-down transistor configured to transmit a low-level voltage to the output terminal GOUT. When the voltage of the first node Q2 is a low level, the sixth transistor T16 may be turned on and configured to transmit the second voltage VGL input to the second voltage input terminal V12 to the output terminal GOUT.

The seventh transistor T17 may be connected between the first voltage input terminal V11 and the output terminal GOUT. A gate of the seventh transistor T17 may be connected to the second node QB. The seventh transistor T17 may be a pull-up transistor configured to transmit a high-level voltage to the output terminal GOUT. When the voltage of the second node QB is a low level, the seventh transistor T17 may be turned on and configured to transmit the first voltage VGH input to the first voltage input terminal V11 to the output terminal GOUT.

The capacitor C1 may be connected between the output terminal GOUT and the first node Q2.

Hereinafter, the operation of the stage ST shown in FIGS. 3 and 4 is described with reference to FIG. 5. For convenience of description, an example where the stage ST (the current stage) of FIGS. 3 and 4 is an odd numbered stage and a first clock signal CLK1 is input to the clock terminal CK is described. An even numbered stage is the same as an odd numbered stage in the configuration and operation with a mere difference that a second clock signal CLK2 is input to a clock terminal CK of the even numbered stage. A start signal STV of a first stage, that is, the first stage ST1 may be an external signal FLM, and a start signal STV of a stage after the first stage may be a previous output signal OUT'. FIG. 5 is a timing diagram of an example in which the stage ST of FIGS. 3 and 4 is an arbitrary stage among odd numbered stages after a second stage.

A high-level voltage OUT_HL of a previous output signal OUT' and an output signal OUT may be about the first voltage VGH, and a low-level voltage OUT_LL may be about the second voltage VGL. A high-level voltage CLK_HL of a first clock signal CLK1 may be less than the first voltage VGH, and a low-level voltage CLK_LL may be the third voltage VGL2 greater than the second voltage VGL.

During a first section P11, a previous output signal OUT' of a high level may be input to an input terminal IN, and a first clock signal CLK1 of a low level may be input to a clock terminal CK.

The first transistor T11 may be turned on according to the third voltage VGL2 of a low level, a previous output signal OUT' of a high level may be transmitted by the turned-on first transistor T11, and a voltage VFQ of the third node FQ may be raised to a high-level voltage FQ_HL approximately equal to a high-level voltage OUT_HL of the previous output signal OUT'.

Because, when a voltage VQ1 of the fourth node Q1 is a low-level voltage Q1_LL2 less than the third voltage VGL2, the voltage VFQ of the third node FQ is a high-level voltage FQ_HL, and a first clock signal CLK1 is a low-level voltage CLK_LL, the second transistor T12 is turned on and the voltage VQ1 of the fourth node Q1 may rise. When a low-level voltage Q1_LL1 of the fourth node Q1 reaches the third voltage VGL2, the second transistor T12 may be turned off.

When the low-level voltage Q1_LL1 of the fourth node Q1 becomes the third voltage VGL2, the third transistor T13 may be turned off and the voltage VQ2 of the first node Q2 may maintain the low level voltage Q2_LL of the previous section. The sixth transistor T16 having a gate connected to the first node Q2 may be turned on, the second voltage VGL may be transmitted to the output terminal GOUT by the turned-on sixth transistor T16, and an output signal OUT of a low level may be output from the output terminal GOUT.

Because the fourth transistor T14 having a gate connected to the first node Q2 or the fourth node Q1 is turned on and the fifth transistor T15 is turned off, the voltage VQB of the second node QB maintains a high level, and thus, the seventh transistor T17 may be turned off. A high-level voltage QB_HL of the second node QB may be about the first voltage VGH.

During a second section P12, a previous output signal OUT' of a high level may be input to an input terminal IN, and a first clock signal CLK1 of a high level may be input to a clock terminal CK.

A previous output signal OUT' of a high level may be transmitted to the third node FQ by the first transistor T11 turned on according to the third voltage VGL2 of a low level, and the voltage VFQ of the third node FQ may be a high-level voltage FQ_HL approximately equal to the high-level voltage OUT_HL of the previous output signal OUT'.

The second transistor T12 may be turned on according to a first clock signal CLK1 of a high level, and the third transistor T13 may be turned on according to the third voltage VGL2 of a low level. The third node FQ, the fourth node Q1, and the first node Q2 may be electrically connected to each other by the turned-on second transistor T12 and third transistor T13, and the voltage VQ1 of the fourth node Q1 and the voltage VQ2 of the first node Q2 may rise to a high level. When the voltage VQ1 of the fourth node Q1 reaches the high-level voltage CLK_HL of a first clock signal CLK1, the second transistor T12 may be turned off. The sixth transistor T6 having the gate connected to the first node Q2 may be turned off.

The fourth transistor T14 having a gate connected to the first node Q2 or the fourth node Q1 may be turned off, and the fifth transistor T15 may be turned on. The second voltage VGL of a low level may be transmitted to the second node QB by the turned-on fifth transistor T15, and the low-level voltage QB_LL of the second node QB may be about the second voltage VGL.

The seventh transistor T17 having a gate connected to the second node QB may be turned on, the first voltage VGH may be transmitted to the output terminal GOUT by the turned-on seventh transistor T17, and an output signal OUT of a high level may be output from the output terminal GOUT. In this case, because output signal OUT rises from a low level to a high level, the first node Q2 is upward bootstrapped by coupling of the capacitor C1, and the voltage VQ2 of the first node Q2 may rise even more. The voltage VQ1 of the fourth node Q1 may further rise due to the turned-on third transistor T13. During the second section P12, the high-level voltage Q2_HL of the first node Q2 and the high-level voltage Q1_HL of the fourth node Q1 may be greater than the first voltage VGH. During the second section P12, the high-level voltage Q2_HL of the first node Q2 and the high-level voltage Q1_HL of the fourth node Q1 may be greater than the high-level voltage FQ_HL of the third node FQ.

During a third section P13, a previous output signal OUT' of a high level may be input to an input terminal IN, and a first clock signal CLK1 of a low level may be input to a clock terminal CK.

A previous output signal OUT' of a high level may be transmitted to the third node FQ by the first transistor T11 turned on according to the third voltage VGL2 of a low level, and the third node FQ may be in a high-level voltage FQ_HL approximately equal to the high-level voltage OUT_HL of the previous output signal OUT'.

The second transistor T12 may be turned off according to a high-level voltage FQ_HL of the third node FQ and a low-level voltage CLK_LL of a first clock signal CLK1, and the third transistor T13 may be turned on according to the third voltage VGL2 of a low level. The voltages VQ2 and VQ1 of the first node Q2 and the fourth node Q1 maintain a high level of the previous section due to the capacitor C1, and the sixth transistor T16 may maintain a turned-off state.

Because the fourth transistor T14 having a gate connected to the first node Q2 or the fourth node Q1 is turned off and the fifth transistor T15 is turned on, the second node QB is in a low-level state due to the fifth transistor T15, and an output signal OUT of a high level may be output from the output terminal GOUT by the turned-on seventh transistor T17.

During a fourth section P14, a previous output signal OUT' of a high level may be input to an input terminal IN, and a first clock signal CLK1 of a high level may be input to a clock terminal CK.

A previous output signal OUT' of a high level may be transmitted to the third node FQ by the first transistor T11 turned on according to the third voltage VGL2 of a low level, and the voltage VFQ of the third node FQ may be a high-level voltage FQ_HL approximately equal to the high-level voltage OUT_HL of the previous output signal OUT'.

Because a high-level voltage CLK_HL of a first clock signal CLK1 is less than a high-level voltage FQ_HL of the third node FQ, the second transistor T12 may be turned off and the third transistor T13 may be turned on according to the third voltage VGL2 of a low level. The voltages VQ2 and VQ1 of the first node Q2 and the fourth node Q1 maintain a high level of the previous section due to the capacitor C1, and the sixth transistor T16 may maintain a turned-off state.

The fourth transistor T14 having a gate connected to the first node Q2 or the fourth node Q1 may be turned off, and the fifth transistor T15 may be turned on. The second voltage VGL of a low level may be transmitted to the second node QB by the turned-on fifth transistor T15, and the seventh transistor T17 may be turned on. The first voltage VGH may be transmitted to the output terminal GOUT by the turned-on seventh transistor T17, and an output signal OUT of a high level may be output from the output terminal GOUT.

During a fifth section P15, a previous output signal OUT' of a high level may be input to an input terminal IN, and a first clock signal CLK1 of a low level may be input to a clock terminal CK.

A previous output signal OUT' of a high level may be transmitted to the third node FQ by the first transistor T11 turned on according to the third voltage VGL2 of a low level, and the voltage VFQ of the third node FQ may be a high-level voltage FQ_HL approximately equal to the high-level voltage OUT_HL of the previous output signal OUT'.

The second transistor T12 may be turned off according to a first clock signal CLK1 of a low level, and the third transistor T13 may be turned on according to the third voltage VGL2 of a low level. The voltages VQ2 and VQ1 of the first node Q2 and the fourth node Q1 maintain a high level of the previous section due to the capacitor C1, and the sixth transistor T16 may maintain a turned-off state.

The fifth transistor T15 having a gate connected to the first node Q2 and the fourth node Q1 may maintain a turn-on state, and an output signal OUT of a high level may be output from the output terminal GOUT by the turned-on seventh transistor T17.

During a sixth section P16, a previous output signal OUT' of a low level may be input to an input terminal IN, and a first clock signal CLK1 of a low level may be input to a clock terminal CK.

A previous output signal OUT' of a low level may be transmitted to the third node FQ by the first transistor T11 turned on according to the third voltage VGL2 of a low level, and the voltage VFQ of the third node FQ may drop. In this case, the low-level voltage FQ_LL1 of the third node FQ may be greater than the low-level voltage OUT_LL of the previous output signal OUT' due to a threshold voltage loss of the first transistor T11. When a low-level voltage FQ_LL1 of the third node FQ reaches the third voltage VGL2, the second transistor T12 may be turned off.

The third transistor T13 is in a turn-on state due to the third voltage VGL2 of a low level, the voltages VQ2 and VQ1 of the first node Q2 and the fourth node Q1 may maintain a high level of the previous section due to the capacitor C1, and the sixth transistor T16 may maintain a turn-off state.

The fifth transistor T15 having a gate connected to the first node Q2 or the fourth node Q1 may maintain a turn-on state, and an output signal OUT of a high level may be output from the output terminal GOUT by the turned-on seventh transistor T17.

During a seventh section P17, a previous output signal OUT' of a low level may be input to an input terminal IN, and a first clock signal CLK1 of a high level may be input to a clock terminal CK.

A previous output signal OUT' of a low level may be transmitted to the third node FQ by the first transistor T11 turned on according to the third voltage VGL2 of a low level, and the voltage VFQ of the third node FQ may be the low-level voltage FQ_LL1 equal to the low-level voltage FQ_LL1 of the sixth section P16.

The second transistor T12 may be turned on according to a first clock signal CLK1 of a high level, and the third transistor T13 may be turned on according to the third voltage VGL2 of a low level. The third node FQ, the fourth node Q1, and the first node Q2 may be electrically connected to each other by the turned-on second transistor T12 and third transistor T13, and the voltages of the fourth node Q1 and the first node Q2 may drop to a low level. When a low-level voltage Q1_LL1 of the fourth node Q1 reaches the third voltage VGL2, the third transistor T13 may be turned off.

The sixth transistor T16 having a gate connected to the first node Q2 may be turned on, the second voltage VGL may be transmitted to the output terminal GOUT by the turned-on sixth transistor T16, and an output signal OUT of a low level may be output from the output terminal GOUT. In this case, because output signal OUT drops from a high level to a low level, the first node Q2 is downward boot-strapped by coupling of the capacitor C1, and the voltage VQ2 of the first node Q2 may drop even more. During a seventh section P17, the low-level voltage Q2_LL of the first node Q2 may be less than the second voltage VGL. During the seventh section P17, the low-level voltage Q2_LL of the first node Q2 may be less than the low-level voltage FQ_LL1 of the third node FQ and the low-level voltage Q1_LL1 of the fourth node Q1.

The fourth transistor T14 having a gate connected to the first node Q2 or the fourth node Q1 may be turned on, and the fifth transistor T15 may be turned off. The first voltage VGH of a high level may be transmitted to the second node QB by the turned-on fourth transistor T14, and the seventh transistor T17 may be turned off.

After the seventh section P17, a previous output signal OUT' of a low level may be input to an input terminal IN, and a first clock signal CLK1 of a low level and a first clock signal CLK1 of a high level may be alternately input to a clock terminal CK.

Because a low-level voltage Q2_LL of the first node Q2 maintained by the capacitor C1 is less than the second voltage VGL, the third transistor T13 may be in a turn-off state. The sixth transistor T16 may maintain a turn-on state, and an output signal OUT of a low level may be output from the output terminal GOUT.

A previous output signal OUT' of a low level may be transmitted to the third node FQ by the first transistor T11 turned on according to the third voltage VGL2 of a low level. When a first clock signal CLK1 of a low level is input, the second transistor T12 may be turned off, the voltage VFQ of the third node FQ may drop to a low-level voltage FQ_LL2 due to coupling of a parasitic capacitor of the second transistor T12, and the voltage VQ1 of the fourth node Q1 may drop to a low-level voltage Q1_LL2. When a first clock signal CLK1 of a high level is input, the second transistor T12 may be turned on and the voltage VQ1 of the fourth node Q1 may become a low-level voltage Q1_LL1 equal to the low-level voltage FQ_LL1 of the third node FQ.

While the voltage VQ2 of the first node Q2 maintains a low-level voltage Q2_LL, the third transistor T13 may be turned off and the voltage VQ2 of the first node Q2 may not be influenced by voltage shaking of the fourth node Q1.

Figure 6:
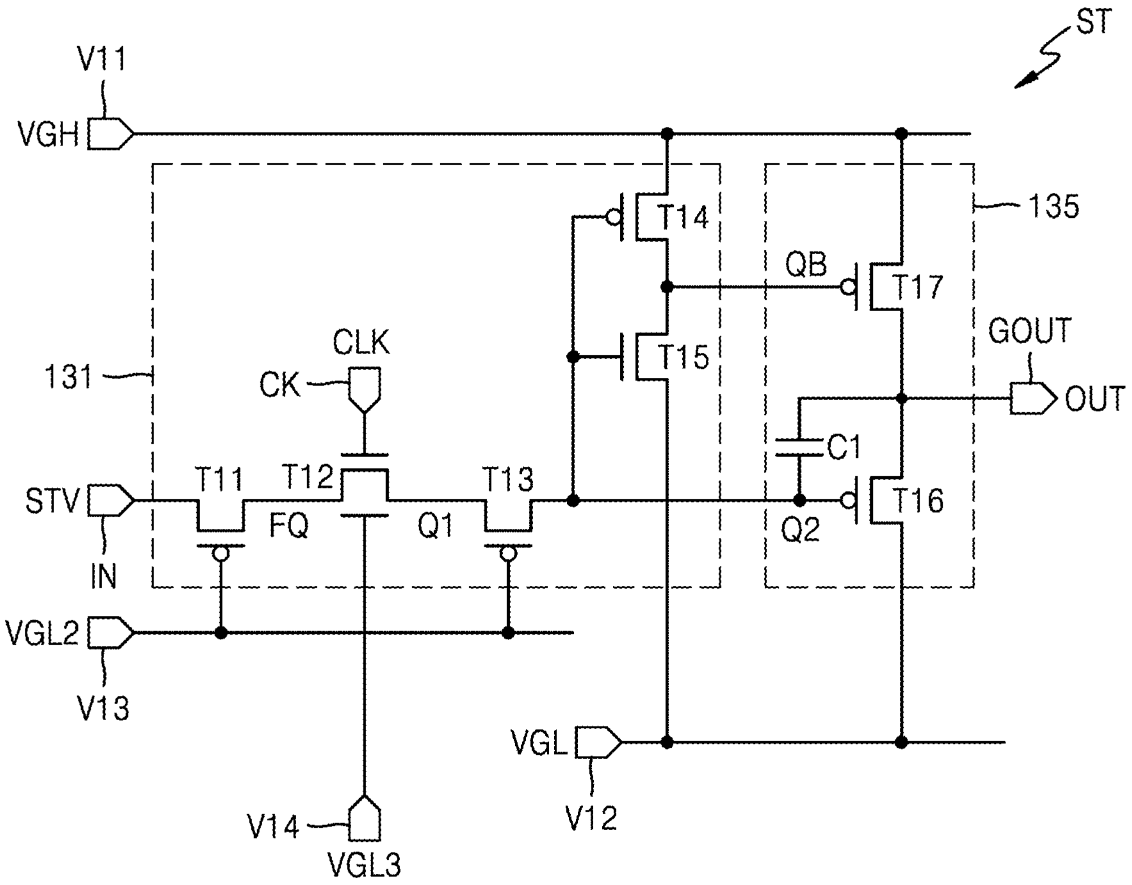
FIGS. 6 to 8 are schematic views of a stage according to an embodiment.
Figure 7:
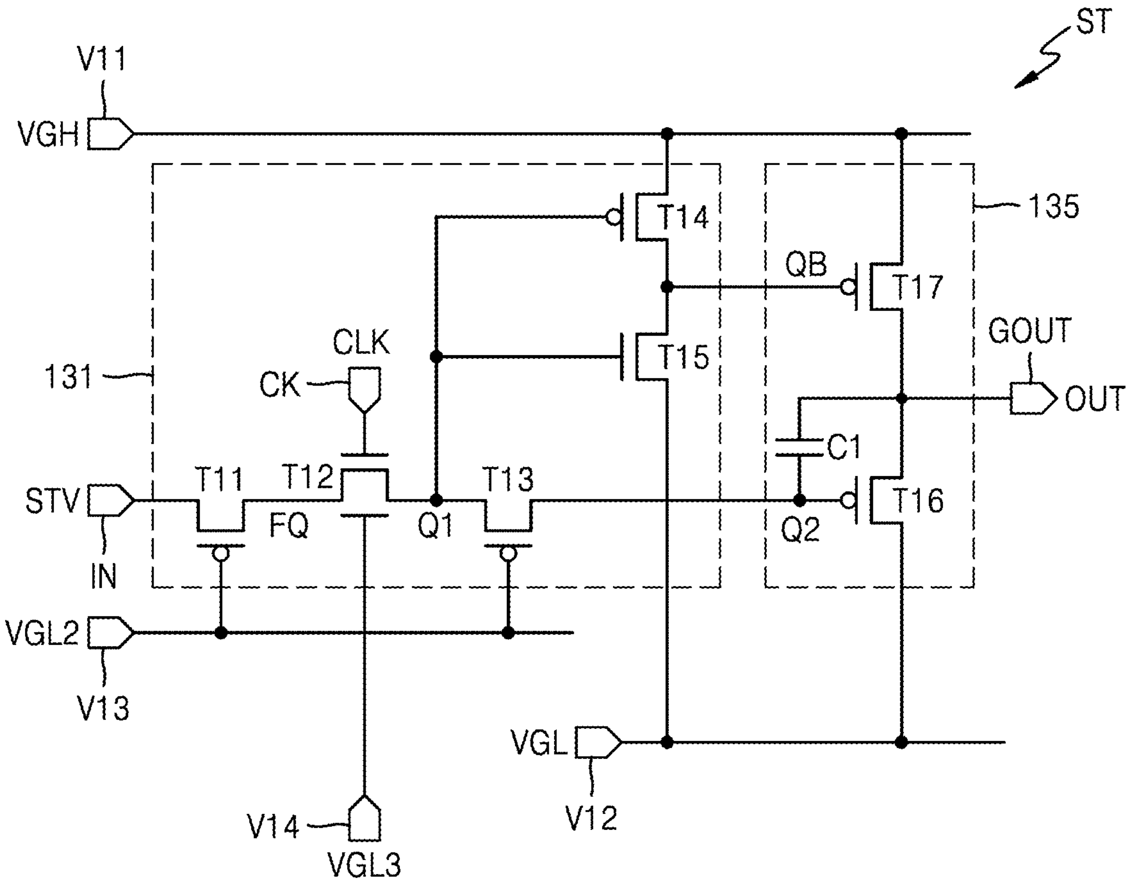
Figure 8:
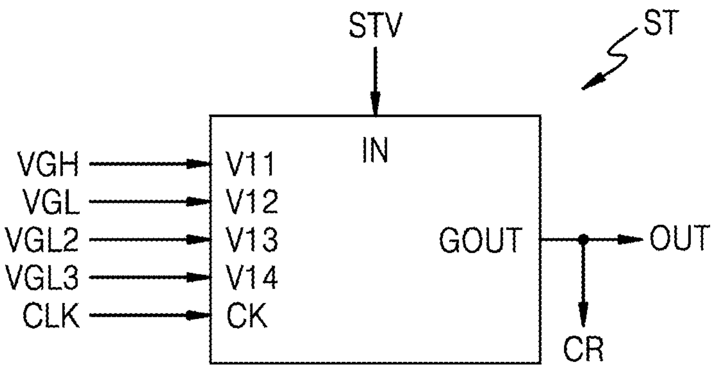

FIGS. 6 to 8 are schematic views of a stage according to an embodiment.

The stage ST shown in FIGS. 6 and 7 is different from the stage ST shown in FIGS. 3 and 4 in that a fourth voltage VGL3 is input to a back gate of the second transistor T12. The other configuration and operation of the stage ST shown in FIGS. 6 and 7 are the same as the configuration and operation of the stage ST shown in FIGS. 3 and 4.

In an embodiment, as shown in FIG. 8, the stage ST may further include a fourth voltage input terminal V14 to which the fourth voltage VGL3 is input. The second transistor T12 may be a dual-gate transistor further including a back gate connected to the fourth voltage input terminal V14. A gate of the second transistor T12 may be a top gate disposed on the upper portion of a semiconductor, and a back gate may be a bottom gate disposed on the lower portion of the semiconductor.

When a (−) voltage is applied to a back gate of an oxide transistor, a threshold voltage may increase and be positive-shifted, and when a (+) voltage is applied to the back gate, the threshold voltage may be reduced and negative-shifted. When the fourth voltage VGL3 is input to the back gate of the second transistor T12, the threshold voltage of the second transistor T12 is positive-shifted and the second transistor T12 may be prevented from operating in a depletion mode due to a negative shift.

The fourth voltage VGL3 may be less than the third voltage VGL2. A difference between the fourth voltage VGL3 and the third voltage VGL2 may be about 3 V, and the fourth voltage VGL3 may be about −10 V. However, the embodiment is not limited thereto. A difference between the fourth voltage VGL3 and the third voltage VGL2 may be determined by the amount of change in the threshold voltage of the second transistor T12. The fourth voltage VGL3 may be denoted by a low-level voltage.

Figure 9:
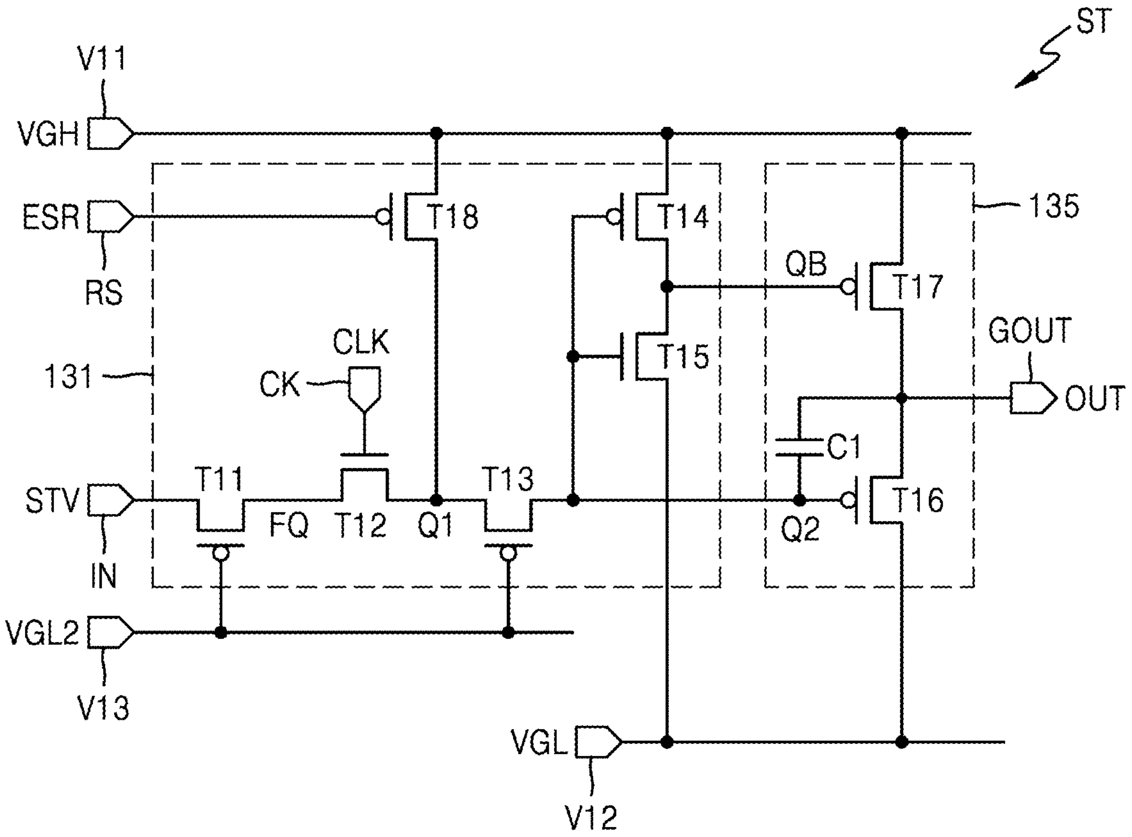
FIGS. 9 to 11 are schematic views of a stage according to an embodiment.
Figure 10:
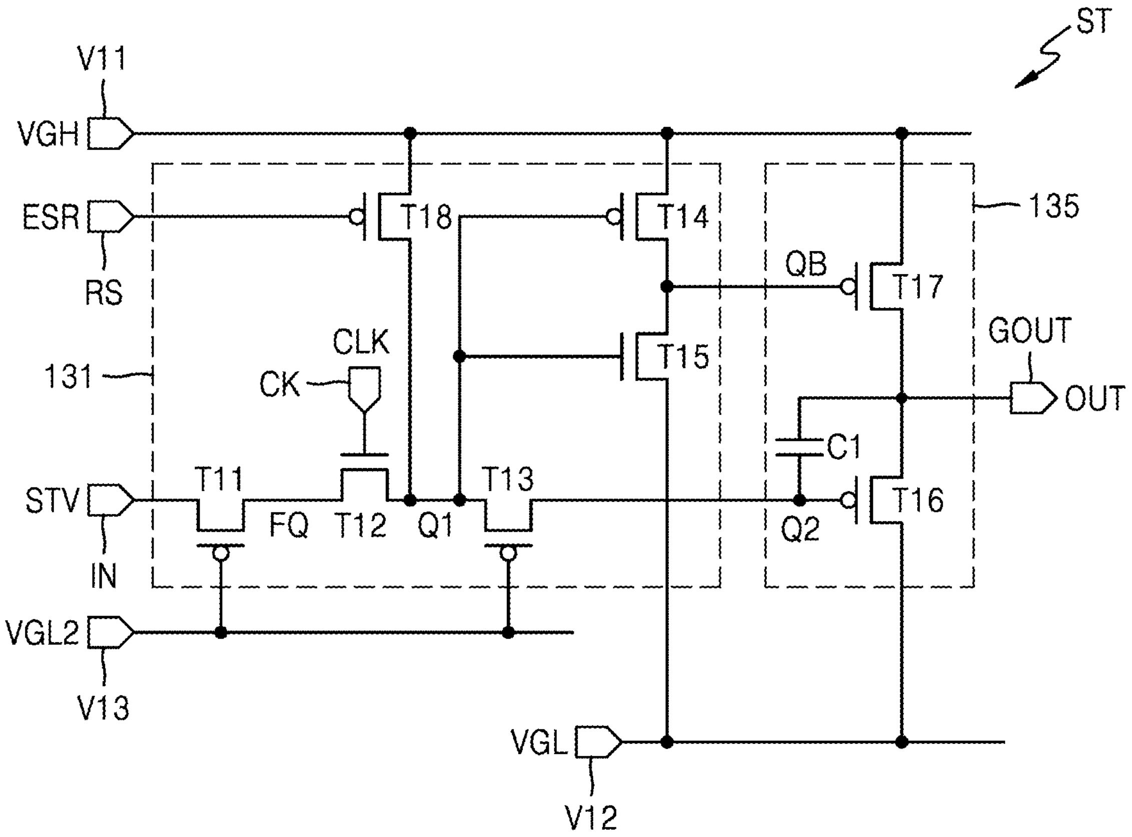
Figure 11:
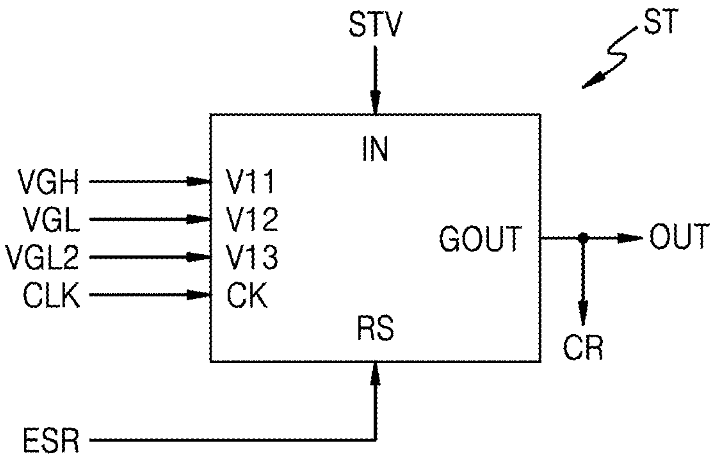

FIGS. 9 to 11 are schematic views of a stage ST according to an embodiment.

The stage ST shown in FIGS. 9 and 10 is different from the stage ST shown in FIGS. 3 and 4 in that it may further includes an eighth transistor T18 as a reset circuit. The other configuration and operation of the stage ST shown in FIGS. 9 and 10 are the same as the configuration and operation of the stage ST shown in FIGS. 3 and 4.

In an embodiment, as shown in FIG. 11, the stage ST may further include a reset terminal RS to which a reset signal ESR is input. The eighth transistor T18 may be configured to reset the fourth node Q1 based on a reset signal ESR supplied to the reset terminal RS. The eighth transistor T18 may be connected between the first voltage input terminal V11 and the fourth node Q1, and a gate of the eighth transistor T18 may be connected to the reset terminal RS. When a low-level reset signal ESR is input to the reset terminal RS, the eighth transistor T18 may be turned on to reset the fourth node Q1 to the first voltage VGH. Accordingly, the fifth transistor T15 may be turned on and an output signal OUT of a high level may be output, and an error where the sixth transistor T16 is turned on and an output of a low level is output may be prevented.

In an embodiment, when an operation error occurs, a reset signal ESR may be supplied as a low level to the first to n-th stages ST1 to STn at a specific point of time. A reset signal ESR may be supplied at a preset timing as a pulse form having a low level of the second voltage VGL and be supplied at the other timings as the first voltage VGH.

Figure 12:
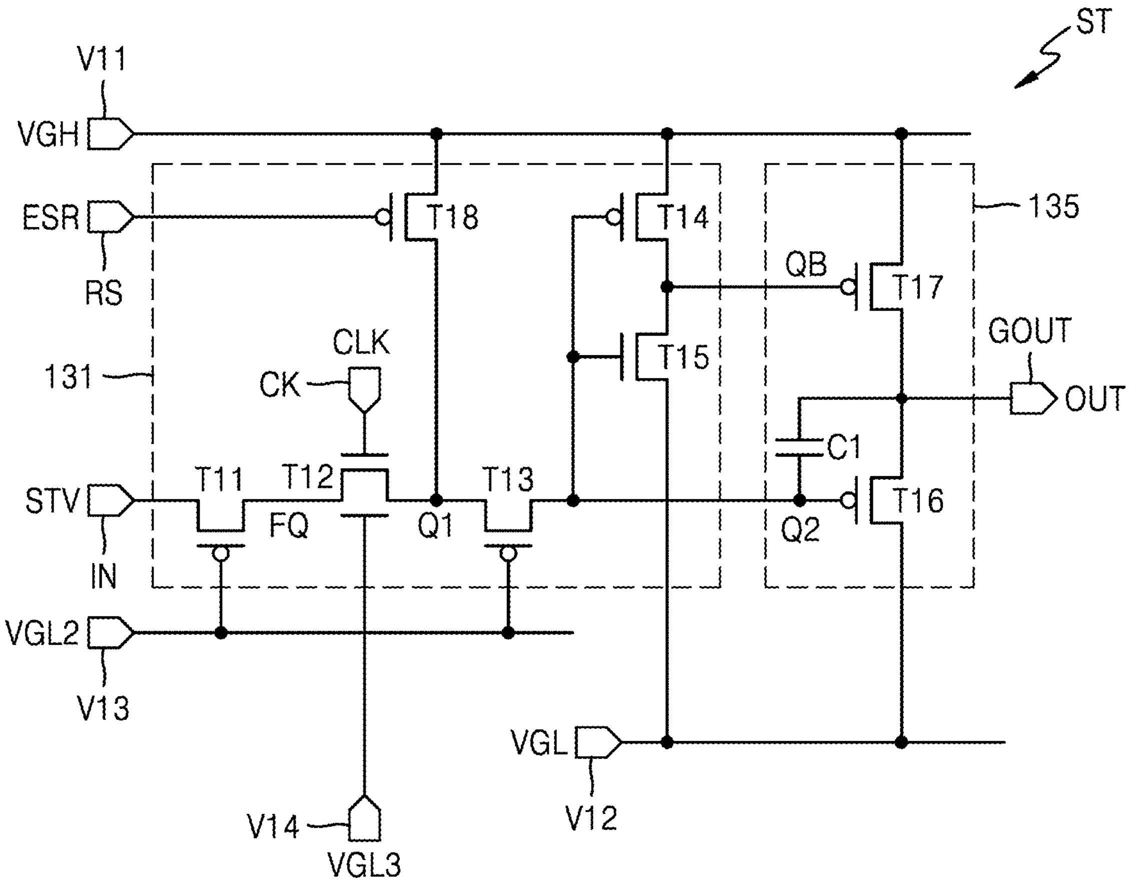
FIGS. 12 to 14 are schematic views of a stage according to an embodiment.
Figure 13:
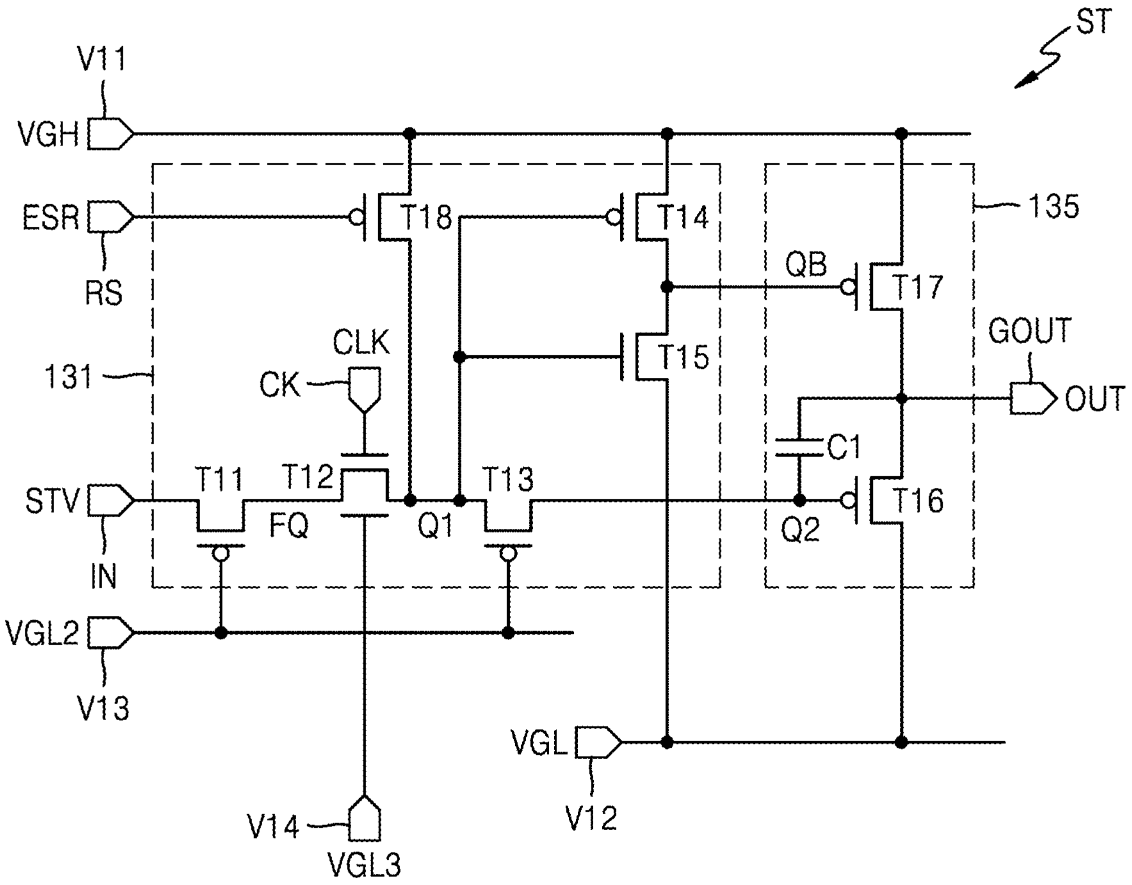
Figure 14:
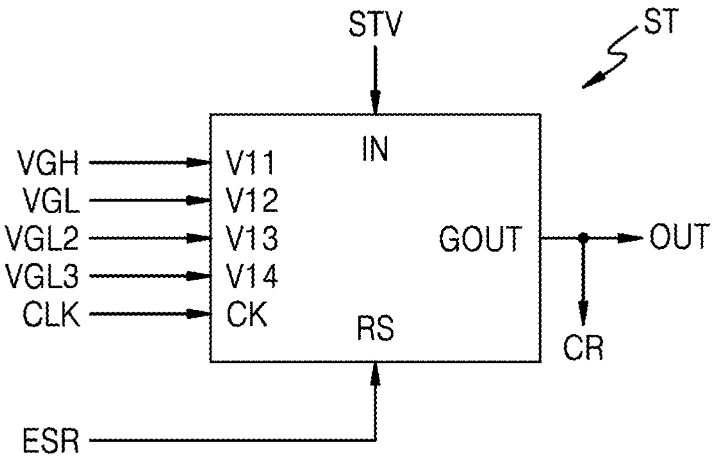

FIGS. 12 to 14 are schematic views of the stage ST according to an embodiment.

The stage ST shown in FIGS. 12 and 13 is different from the stage ST shown in FIGS. 3 and 4 in that the fourth voltage VGL3 is input to a back gate of the second transistor T12 and the eighth transistor T18 is further included as a reset circuit. The other configuration and operation of the stage ST shown in FIGS. 12 and 13 are the same as the configuration and operation of the stage ST shown in FIGS. 3 and 4.

In an embodiment, as shown in FIG. 14, the stage ST may further include the fourth voltage input terminal V14 to which the fourth voltage VGL3 is input and the reset terminal RS to which a reset signal ESR is input. Because the configuration and operation of the second transistor T12 and the eighth transistor T18 are described with reference to FIGS. 6 to 11, descriptions thereof are omitted below.

Figure 15:
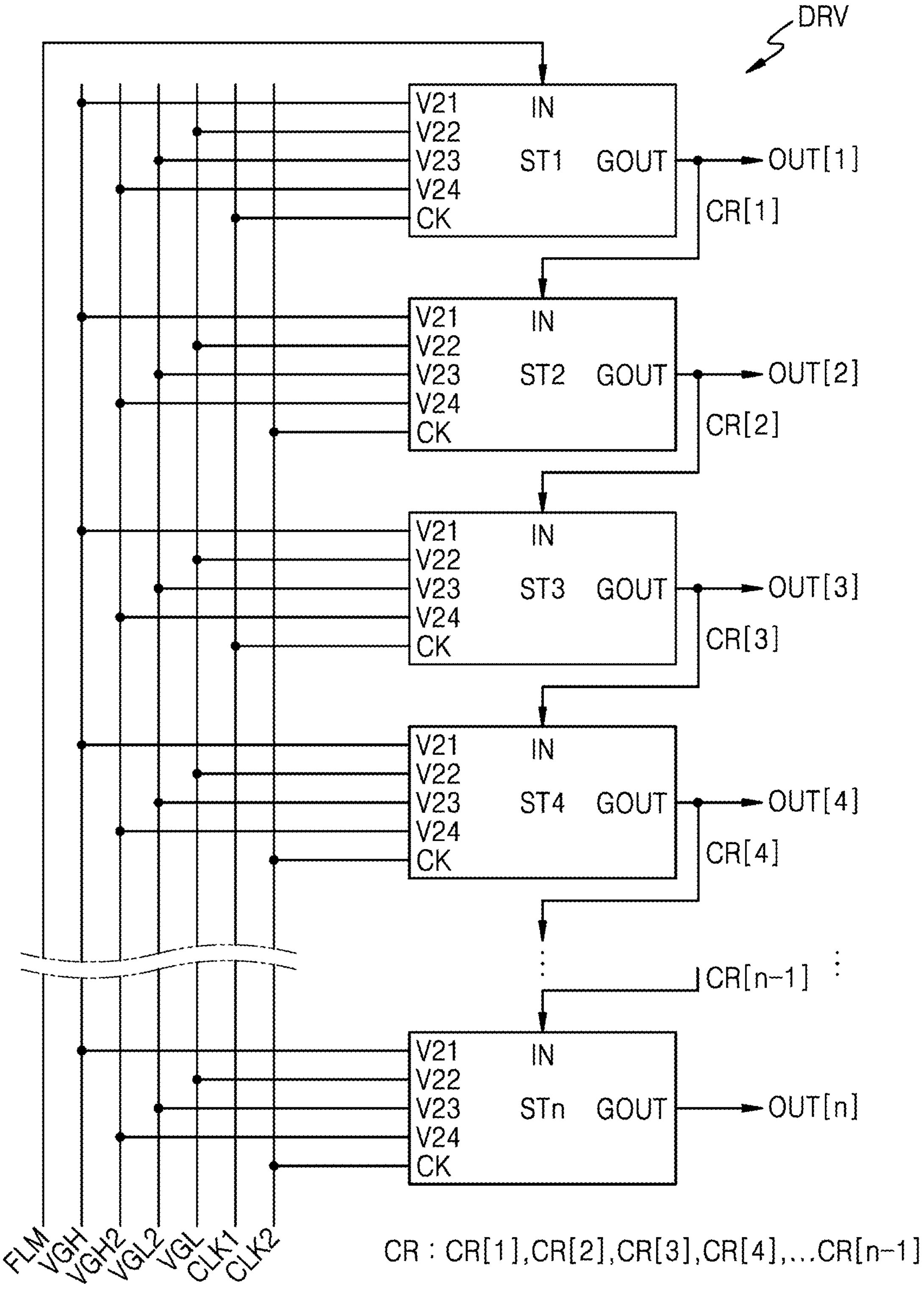
FIG. 15 is a schematic view of a driving circuit according to an embodiment.

FIG. 15 is a schematic view of a driving circuit DRV according to an embodiment. Hereinafter, differences from the driving circuit DRV shown in FIG. 1 is described, and detailed descriptions of the same configuration are omitted.

Referring to FIG. 15, the driving circuit DRV according to an embodiment may include a plurality of stages ST1 to STn. The plurality of stages ST1 to STn may be configured to sequentially output the output signals OUT[1], OUT[2], OUT[3], OUT[4], . . . , OUT[n].

Each of the stages ST1 to STn may include an input terminal IN, a first voltage input terminal V21, a second voltage input terminal V22, a third voltage input terminal V23, a fourth voltage input terminal V24, a clock terminal CK, and an output terminal GOUT.

A start signal may be input (supplied or provided) to the input terminal IN. The plurality of stages ST1 to STn may be configured to output the output signals OUT[1], OUT[2], OUT[3], OUT[4], . . . , OUT[n] in response to a start signal, respectively. The start signal may be an external signal FLM or the carry signals CR[1], CR[2], CR[3], CR[4], . . . , CR[n−1]. An external signal FLM as a start signal may be input to an input terminal IN of the first stage ST1, and a previous output signal OUT' may be input as a start signal to an input terminal IN of each of the second to n-th stages ST2 to STn.

A first voltage VGH may be input to the first voltage input terminal V21, a second voltage VGL may be input to the second voltage input terminal V22, a third voltage VGL2 may be input to a third voltage input terminal V23, and a fifth voltage VGH2 may be input to the fourth voltage input terminal V24. The second voltage VGL may be a voltage less than the first voltage VGH. The third voltage VGL2 may be less than the first voltage VGH and greater than the second voltage VGL. The fifth voltage VGH2 may be less than the first voltage VGH and greater than the third voltage VGL2. A voltage level of the second voltage VGL may be less than a voltage level of the first voltage VGH. A voltage level of the third voltage VGL2 may be between a voltage level of the first voltage VGH and a voltage level of the second voltage VGL. A voltage level of the fifth voltage VGH2 may be between a voltage level of the first voltage VGH and a voltage level of the third voltage VGL2. The first voltage VGH and the fifth voltage VGH2 may be denoted by a high-level voltage, and the second voltage VGL and the third voltage VGL2 may be denoted by low-level voltages. In an embodiment, the first voltage VGH may be about 6.5 V, the fifth voltage VGH2 may be about 4 V, the second voltage VGL may be about −9.5 V, and the third voltage VGL2 may be about −7 V. However, the embodiment is not limited thereto.

A clock signal CLK may be input to the clock terminal CK. A clock signal CLK may include a first clock signal CLK1 and a second clock signal CLK2. A first clock signal CLK1 or a second clock signal CLK2 may be input to the clock terminal CK. In an embodiment, a first clock signal CLK1 may be input to a clock terminal of the odd numbered stages ST1, ST3, . . . , and a second clock signal CLK2 may be input to a clock terminal CK of the even numbered stages ST2, ST4, . . . . In an embodiment, a second clock signal CLK2 may be input to a clock terminal of the odd numbered stages ST1, ST3, . . . , and a first clock signal CLK1 may be input to a clock terminal CK of the even numbered stages ST2, ST4, . . . . In an embodiment, although the high-level voltage CLK_HL of a clock signal CLK may be about 4 V, and the low-level voltage CLK_LL of a clock signal CLK may be about −7 V, the embodiment is not limited thereto.

Figure 18:
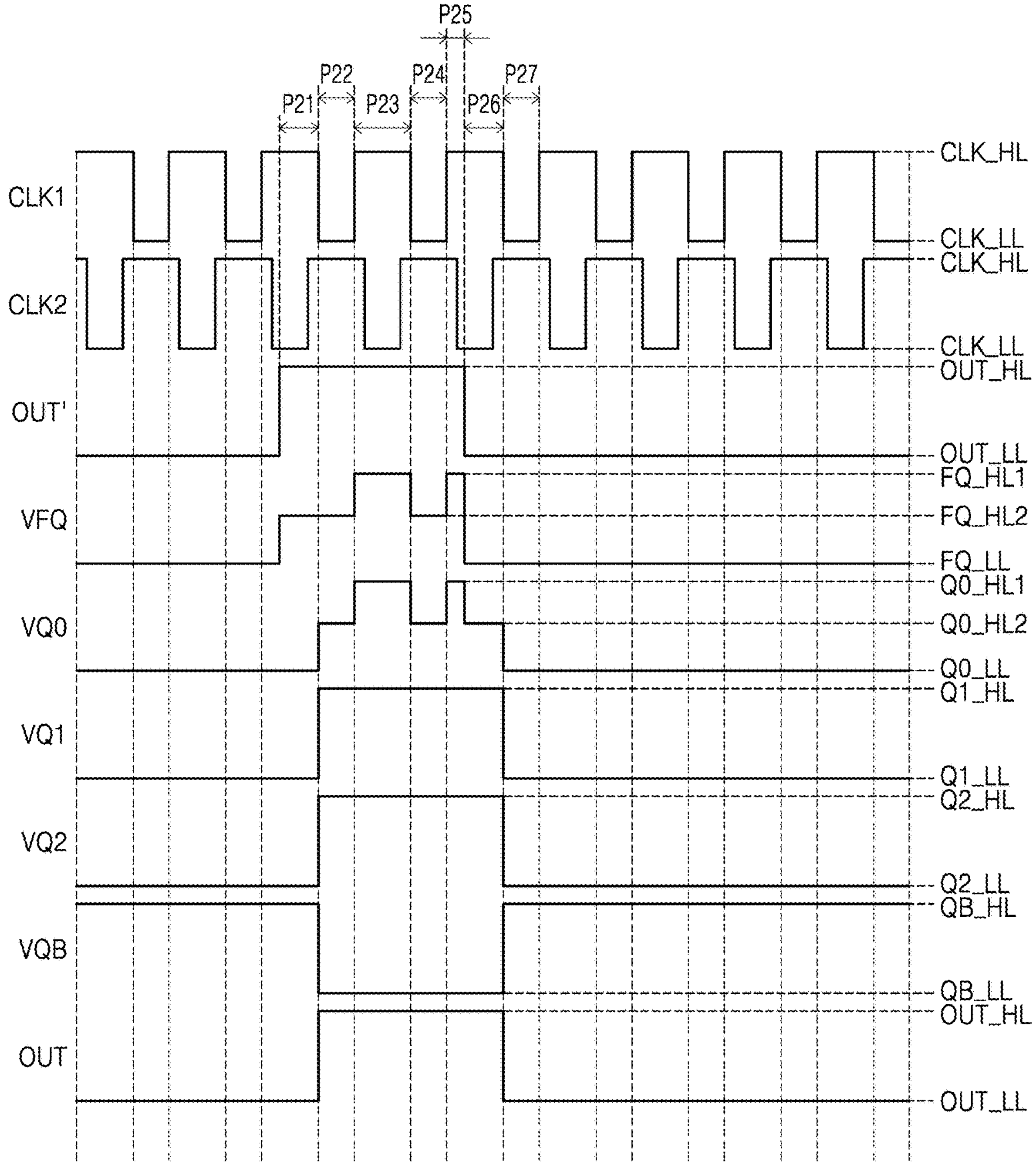
FIG. 18 is a timing diagram to explain driving of the stages of FIGS. 16 and 17.

A first clock signal CLK1 and a second clock signal CLK2 may be signals having the same waveform with a shifted phase. As an example, a second clock signal CLK2 may have the same waveform as a first clock signal CLK1 and be input with a phase shifted (phase-delayed) by a preset interval. The second clock signal CLK2 may be shifted by a half cycle from the first clock signal CLK1. In an embodiment, in a first clock signal CLK1 and a second clock signal CLK2, a duration in which a high-level voltage is maintained during one cycle may be equal to a duration in which a low-level voltage is maintained. In an embodiment, as shown in FIG. 18, in a first clock signal CLK1 and a second clock signal CLK2, a duration in which a high-level voltage is maintained during one cycle may be greater than a duration in which a low-level voltage is maintained.

As shown in FIG. 2, output signals OUT[1], OUT[2], OUT[3], OUT[4], . . . , OUT[n] of a high-level voltage from the output terminal GOUT of the stages ST1 to STn may be sequentially shifted by a ½ cycle of a clock signal. In an embodiment, a high-level voltage OUT_HL and a low-level voltage OUT_LL of output signals may be the first voltage VGH and the second voltage VGL, respectively.

Figure 16:
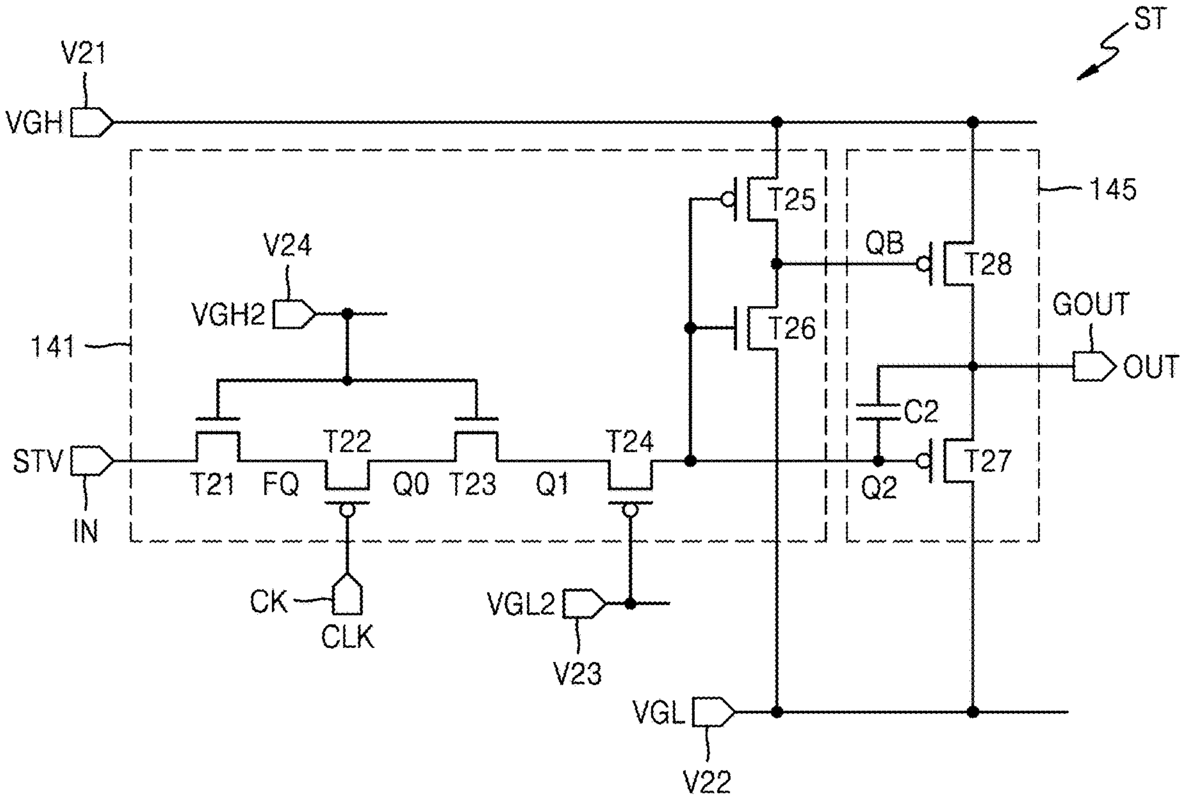
FIGS. 16 and 17 are schematic views showing an example of a stage included in the driving circuit of FIG. 15.
Figure 17:
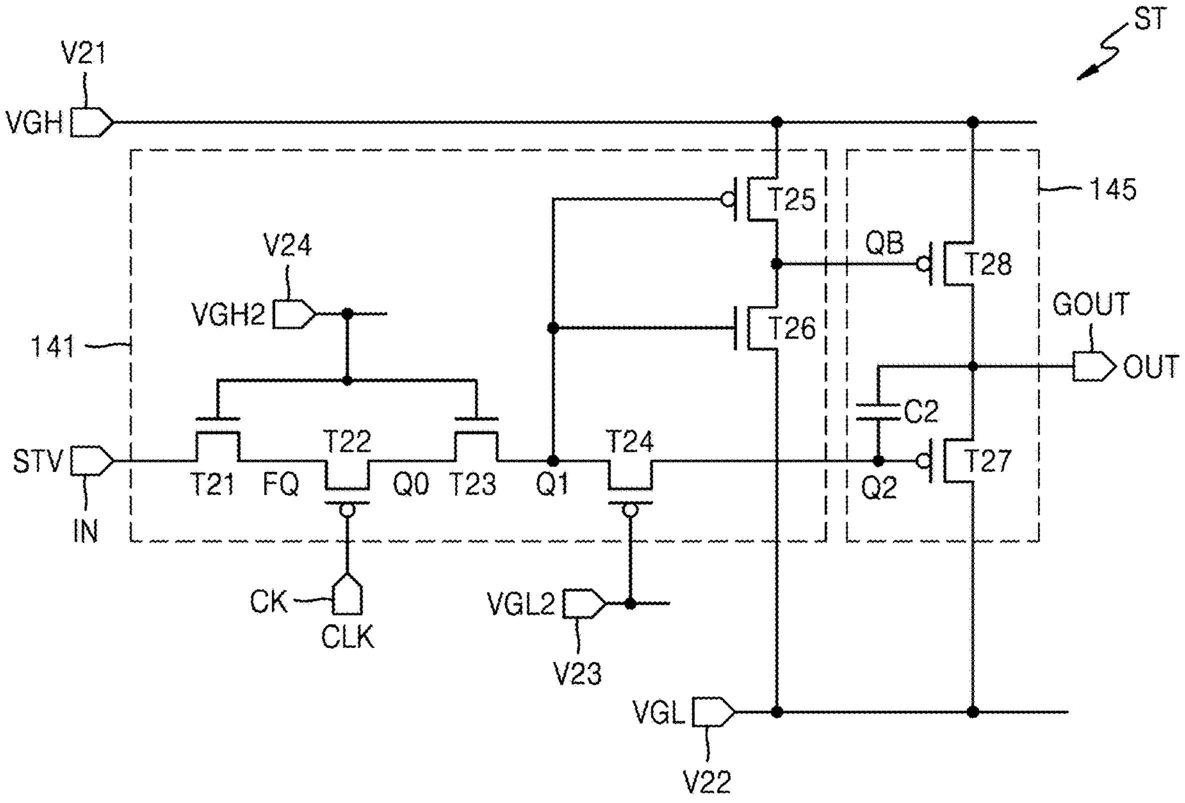

FIGS. 16 and 17 are schematic views showing an example of the stage ST included in the driving circuit of FIG. 15. FIG. 18 is a timing diagram to explain driving of the stage ST of FIGS. 16 and 17.

Referring to FIGS. 16 and 17, the stage ST may include a control circuit 141 and an output circuit 145. Each of the control circuit 141 and the output circuit 145 may include at least one transistor. In an embodiment, the at least one transistor may include an N-channel transistor and/or a P-channel transistor. In an embodiment, the impurity conduction type of a first transistor T21, a third transistor T23, and a sixth transistor T26 of the stage ST may be opposite to the impurity conduction type of the remaining transistors. As an example, the first transistor T21, the third transistor T23, and the sixth transistor T26 may be N-channel transistors, and a second transistor T22, a fourth transistor T24, a fifth transistor T25, a seventh transistor T27, and an eighth transistor T28 may be P-channel transistors.

The control circuit 141 may be configured to control the voltages of a first node Q2 and a second node QB in response to a signal input to an input terminal IN. As an example, the control circuit 141 may be configured to control the voltages of the first node Q2 and the second node QB in response to a start signal STV (e.g., an external signal FLM or a carry signal CR (see FIG. 15)). In an embodiment, a carry signal CR may be a previous output signal OUT'. The control circuit 141 may include the first to sixth transistors T21 to T26.

The first to fourth transistors T21 to T24 may be connected between the input terminal IN and the first node Q2. For convenience of description, hereinafter, a node between the first transistor T21 and the second transistor T22 is referred to as the third node FQ, a node between the third transistor T23 and the fourth transistor T24 is referred to as the fourth node Q1, and a node between the second transistor T22 and the third transistor T23 is referred to as the fifth node Q0.

The first transistor T21 may be connected between the input terminal IN and the third node FQ. A gate of the first transistor T21 may be connected to a fourth voltage input terminal V24. The first transistor T21 may be turned on by a fifth voltage VGH2 input to the fourth voltage input terminal V24 and be configured to transmit a start signal STV to the third node FQ. Because the voltage of the third node FQ becomes a voltage less than a high level of a start signal STV due to the first transistor T21, the turn-on of the second transistor T22 may be prevented when a clock signal CLK of a high level is input to a gate of the second transistor T22.

The second transistor T22 may be connected between the third node FQ and the fifth node Q0. A gate of the second transistor T22 may be connected to a clock terminal CK. The second transistor T22 may be controlled to be turned on and turned off according to the voltage of the third node FQ, the voltage of the fifth node Q0, and the voltage of a clock signal CLK input to the clock terminal CK, and be configured to transmit a signal transmitted to the third node FQ to the fifth node Q0 when turned on. A clock signal CLK may be a first clock signal CLK1 or a second clock signal CLK2. The second transistor T22 may be configured to control electrical connection between the third node FQ and the fifth node Q0.

The third transistor T23 may be connected between the fifth node Q0 and the fourth node Q1. A gate of the third transistor T23 may be connected to the fourth voltage input terminal V24. The third transistor T23 may be controlled to be turned on and turned off according to the voltage of the fifth node Q0, the voltage of the fourth node Q1, and the fifth voltage VGH2 input to the fourth voltage input terminal V24, and be configured to transmit a signal transmitted to the fifth node Q0 to the fourth node Q1 when turned on. The third transistor T23 may be configured to control electrical connection between the fifth node Q0 and the fourth node Q1. The third transistor T23 may disconnect the fifth node Q0 from the fourth node Q1 such that the first node Q2 and the fourth node Q1 are upward bootstrapped.

The fourth transistor T24 may be connected between the fourth node Q1 and the first node Q2. A gate of the fourth transistor T24 may be connected to the third voltage input terminal V23. The fourth transistor T24 may be configured to be turned on or turned off according to the voltage of the fourth node Q1, the voltage of the first node Q2, and the third voltage VGL2 input to the third voltage input terminal V23, and configured to transmit a signal transmitted to the fourth node Q1 to the first node Q2 or transmit a signal of the first node Q2 to the fourth node Q1 when turned on. The fourth transistor T24 may be configured to control electrical connection between the fourth node Q1 and the first node Q2. The fourth transistor T24 may disconnect the fourth node Q1 from the first node Q2 such that the first node Q2 is downward bootstrapped. When the voltage of the first node Q2 is a low level, the fourth transistor T24 may be turned off, and the voltage VQ2 of the first node Q2 may be not be influenced by voltage shaking of the fifth node Q0.

The fifth transistor T25 may be connected between the first voltage input terminal V21 and the second node QB. In an embodiment, as shown in FIG. 16, a gate of the fifth transistor T25 may be connected to the first node Q2. In an embodiment, as shown in FIG. 17, a gate of the fifth transistor T25 may be connected to the fourth node Q1. When the voltage of the first node Q2 or the fourth node Q1 is a low level, the fifth transistor T25 may be turned on and configured to transmit the first voltage VGH input to the first voltage input terminal V21 to the second node QB. Due to the fifth transistor T25, the voltage level of the voltage of the second node QB may be opposite to the voltage level of the voltage of the first node Q2 or the fourth node Q1.

The sixth transistor T26 may be connected between the second node QB and the second voltage input terminal V22. In an embodiment, as shown in FIG. 16, a gate of the sixth transistor T26 may be connected to the first node Q2. In an embodiment, as shown in FIG. 17, a gate of the sixth transistor T26 may be connected to the fourth node Q1. When the voltage of the first node Q2 or the fourth node Q1 is a high level, the sixth transistor T26 may be turned on and configured to transmit the second voltage VGL input to the second voltage input terminal V22 to the second node QB. Due to the sixth transistor T26, the voltage level of the voltage of the second node QB may be opposite to the voltage level of the voltage of the fourth node Q1.

The fifth transistor T25 and the sixth transistor T26 may be configured to control the voltage level of the voltage of the second node QB according to the voltage level of the voltage of the first node Q2 or the fourth node Q1 and may serve as an inverter or a level shifter.

The output circuit 145 may be connected between the first voltage input terminal V21 and the second voltage input terminal V22. The output circuit 145 may be configured to output an output signal OUT of a high-level voltage or a low-level voltage according to the voltage level of the first node Q2 or the second node QB. The output circuit 145 may include the seventh transistor T27 and the eighth transistor T28. The output circuit 145 may further include a capacitor C2.

The seventh transistor T27 may be connected between the output terminal GOUT and the second voltage input terminal V22. A gate of the seventh transistor T27 may be connected to the first node Q2. The seventh transistor T27 may be a pull-down transistor configured to transmit a low-level voltage to the output terminal GOUT. When the voltage of the first node Q2 is a low level, the seventh transistor T27 may be turned on and configured to transmit the second voltage VGL input to the second voltage input terminal V22 to the output terminal GOUT.

The eighth transistor T28 may be connected between the first voltage input terminal V21 and the output terminal GOUT. A gate of the eighth transistor T28 may be connected to the second node QB. The eighth transistor T28 may be a pull-up transistor configured to transmit a high-level voltage to the output terminal GOUT. When the voltage of the second node QB is a low level, the eighth transistor T28 may be turned on and configured to transmit the first voltage VGH input to the first voltage input terminal V21 to the output terminal GOUT.

The capacitor C2 may be connected between the output terminal GOUT and the first node Q2.

Hereinafter, the operation of the stage ST shown in FIGS. 16 and 17 is described with reference to FIG. 18. For convenience of description, an example where the stage ST (the current stage) of FIGS. 16 and 17 is an odd numbered stage and a first clock signal CLK1 is input to the clock terminal CK is described. An even numbered stage is the same as an odd numbered stage in the configuration and operation with a mere difference that a second clock signal CLK2 is input to a clock terminal CK of the even numbered stage. A start signal STV of a first stage, that is, the first stage ST1 may be an external signal FLM, and a start signal STV of a stage after the first stage may be a previous output signal OUT'. FIG. 18 is a timing diagram of an example in which the stage ST of FIGS. 16 and 17 is an arbitrary stage among odd numbered stages after a second stage.

During a first section P21, a previous output signal OUT' of a high level may be input to an input terminal IN, and a first clock signal CLK1 of a high level may be input to a clock terminal CK.

The first transistor T21 may be turned on according to the fifth voltage VGH2 of a high level, and a previous output signal OUT' of a high level may be transmitted to the third node FQ, and the voltage VFQ of the third node FQ may rise to a high-level voltage FQ_HL2. Because the high-level voltage FQ_HL2 of the third node FQ is less than the high-level voltage OUT_HL of the previous output signal OUT' due to a threshold loss of the first transistor T21 and is close to a high-level voltage CLK_HL of a first clock signal CLK1, the second transistor T22 may be turned off.

The third transistor T23 may be turned on according to the fifth voltage VGH2 of a high level, the fourth transistor T24 may be turned on according to the third voltage VGL2 of a low level, and a voltage VQ0 of the fifth node Q0, a voltage VQ1 of the fourth node Q1, and a voltage VQ2 of the first node Q2 may maintain low-level voltages Q0_LL, Q1_LL, and Q2_LL of the previous section, respectively. The seventh transistor T27 having a gate connected to the first node Q2 may be turned on, the second voltage VGL may be transmitted to the output terminal GOUT by the turned-on seventh transistor T27, and an output signal OUT of a low level may be output from the output terminal GOUT.

Because the fifth transistor T25 having a gate connected to the first node Q2 or the fourth node Q1 maintains a turn-on state, and the voltage of the second node QB maintains a high level, the eighth transistor T28 may be in a turn-off state.

During a second section P22, a previous output signal OUT' of a high level may be input to an input terminal IN, and a first clock signal CLK1 of a low level may be input to a clock terminal CK.

A previous output signal OUT' of a high level may be transmitted to the third node FQ by the first transistor T21 turned on according to the fifth voltage VGH2 of a high level, and the voltage VFQ of the third node FQ may be a high-level voltage FQ_HL2. The second transistor T22 may be turned on according to a first clock signal CLK1 of a low level, the third transistor T23 may be turned on according to the fifth voltage VGH2 of a high level, and the fourth transistor T24 may be turned on according to the third voltage VGL2 of a low level. A voltage VQ0 of the fifth node Q0, a voltage VQ1 of the fourth node Q1, and a voltage VQ2 of the first node Q2 may rise to a high level due to the turned-on second transistor T22, third transistor T23, and fourth transistor T24. The seventh transistor T27 having the gate connected to the first node Q2 may be turned off. When the voltage VQ0 of the fifth node Q0 reaches the high-level voltage CLK_HL of a first clock signal CLK1, the third transistor T23 may be turned off.

The fifth transistor T25 having a gate connected to the first node Q2 or the fourth node Q1 may be turned off, and the sixth transistor T26 may be turned on. The second voltage VGL of a low level may be transmitted to the second node QB by the turned-on sixth transistor T26, and the eighth transistor T28 may be turned on. The first voltage VGH may be transmitted to the output terminal GOUT by the turned-on eighth transistor T28, and an output signal OUT of a high level may be output from the output terminal GOUT. In this case, because output signal OUT rises from a low level to a high level, the voltage VQ2 of the first node Q2 and the voltage of the fourth node Q1 electrically connected to the first node Q2 may rise even more due to coupling of the capacitor C2. During the second section P22, the high-level voltage Q2_HL of the first node Q2 and the high-level voltage Q1_HL of the fourth node Q1 may be greater than the first voltage VGH. During the second section P22, the high-level voltage Q2_HL of the first node Q2 and the high-level voltage Q1_HL of the fourth node Q1 may be greater than the high-level voltage FQ_HL2 of the third node FQ and the high-level voltage Q0_HL2 of the fifth node Q0.

During a third section P23, a previous output signal OUT' of a high level may be input to an input terminal IN, and a first clock signal CLK1 of a high level may be input to a clock terminal CK.

A previous output signal OUT' of a high level may be transmitted to the third node FQ by the first transistor T21 turned on according to the third voltage VGL2 of a low level. When the voltage VFQ of the third node FQ reaches the high level voltage CLK_HL of a first clock signal CLK1, the second transistor T22 may be turned off, the voltage VFQ of the third node FQ rises to the high-level voltage FQ_HL1 due to coupling of a parasitic capacitor of the second transistor T22, and the voltage VQ0 of the fifth node Q0 may rise to the high-level voltage Q0_HL1. The high-level voltage FQ_HL1 of the third node FQ and the high-level voltage Q0_HL1 of the fifth node Q0 may be greater than the fifth voltage VGH2.

The third transistor T23 may be turned off according to the voltage VQ0 of a high level of the fifth node Q0 and the fifth voltage VGH2 of a high level, and the fourth transistor T24 may be in a turn-on state according to the third voltage VGL2 of a low level. The voltages of the first node Q2 and the fourth node Q1 maintain a high level of the previous section due to the capacitor C2, and the seventh transistor T27 may maintain a turned-off state.

The sixth transistor T26 having a gate connected to the first node Q2 or the fourth node Q1 may maintain a turn-on state, and an output signal OUT of a high level may be output from the output terminal GOUT by the turned-on eighth transistor T28.

During a fourth section P24, a previous output signal OUT' of a high level may be input to an input terminal IN, and a first clock signal CLK1 of a low level may be input to a clock terminal CK.

A previous output signal OUT' of a high level may be transmitted to the third node FQ by the first transistor T21 turned on according to the fifth voltage VGH2 of a high level, and the voltage VFQ of the third node FQ may be a high-level voltage FQ_HL2. The second transistor T22 may be turned on according to the high-level voltage FQ_HL2 of the third node FQ and a first clock signal CLK1 of a low level, and the voltage VQ0 of the fifth node Q0 may be the high-level voltage Q0_HL2 equal to the high-level voltage FQ_HL2 of the third node FQ.

The third transistor T23 may be in a turn-off state according to the voltage VQ0 of the fifth node Q0 of a high level and the fifth voltage VGH2 of a high level. The voltages of the first node Q2 and the fourth node Q1 maintain a high level of the previous section due to the capacitor C2, and the sixth transistor T26 may maintain a turned-off state.

The fifth transistor T25 having a gate connected to the first node Q2 or the fourth node Q1 may maintain a turn-on state, and an output signal OUT of a high level may be output from the output terminal GOUT.

During a fifth section P25, a previous output signal OUT' of a high level may be input to an input terminal IN, and a first clock signal CLK1 of a high level may be input to a clock terminal CK.

A previous output signal OUT' of a high level may be transmitted to the third node FQ by the first transistor T21 turned on according to the third voltage VGL2 of a low level. When the voltage VFQ of the third node FQ reaches the high level voltage CLK_HL of a first clock signal CLK1, the second transistor T22 may be turned off, the voltage VFQ of the third node FQ rises to the high-level voltage FQ_HL1 due to coupling of a parasitic capacitor of the second transistor T22, and the voltage VQ0 of the fifth node Q0 may rise to the high-level voltage Q0_HL1. The high-level voltage FQ_HL1 of the third node FQ and the high-level voltage Q0_HL1 of the fifth node Q0 may be greater than the fifth voltage VGH2.

The third transistor T23 may be turned off according to the voltage VQ0 of a high level of the fifth node Q0 and the fifth voltage VGH2 of a high level, and the fourth transistor T24 may be in a turn-on state according to the third voltage VGL2 of a low level. The voltages of the first node Q2 and the fourth node Q1 maintain a high level of the previous section due to the capacitor C2, and the seventh transistor T27 may maintain a turned-off state.

The sixth transistor T26 having a gate connected to the first node Q2 or the fourth node Q1 may maintain a turn-on state, and an output signal OUT of a high level may be output from the output terminal GOUT by the turned-on eighth transistor T28.

During a sixth section P26, a previous output signal OUT' of a low level may be input to an input terminal IN, and a first clock signal CLK1 of a high level may be input to a clock terminal CK.

The first transistor T21 may be turned on according to the fifth voltage VGH2 of a high level, and a previous output signal OUT' of a low level may be transmitted to the third node FQ, and the voltage VFQ of the third node FQ may drop to a low-level voltage FQ_LL. The low-level voltage FQ_LL of the third node FQ may be a low-level voltage OUT_LL of the previous output signal OUT'.

The second transistor T22 may be turned off according to a first clock signal CLK1 of a high level, and the third transistor T23 in a turn-off state may be turned on when the voltage VQ0 of the fifth node Q0 drops to the fifth voltage VGH2.

The fourth transistor T24 may be in a turn-on state according to the third voltage VGL2 of a low level. The voltages of the first node Q2 and the fourth node Q1 maintain a high level of the previous section due to the capacitor C2, and the seventh transistor T27 may maintain a turned-off state.

The sixth transistor T26 having a gate connected to the first node Q2 or the fourth node Q1 may maintain a turn-on state, and an output signal OUT of a high level may be output from the output terminal GOUT by the turned-on eighth transistor T28.

During a seventh section P27, a previous output signal OUT' of a low level may be input to an input terminal IN, and a first clock signal CLK1 of a low level may be input to a clock terminal CK.

The first transistor T21 is turned on according to the fifth voltage VGH2 of a high level, a previous output signal OUT' of a low level may be transmitted to the third node FQ, and the voltage VFQ of the third node FQ may be a low-level voltage FQ_LL equal to the low-level voltage OUT_LL of the previous output signal OUT'.

The second transistor T22 may be turned on according to the first clock signal CLK1 of a low level, and the voltage VQ0 of the fifth node Q0 may drop to a low-level voltage Q0_LL greater than the low-level voltage FQ_LL of the third node FQ due to a threshold voltage loss of the second transistor T22.

The third transistor T23 may be turned on according to the fifth voltage VGH2 of a high level, and the voltage VQ1 of the fourth node Q1 may drop to a low-level voltage Q1_LL equal to the low-level voltage Q0_LL of the fifth node Q0.

The third transistor T23 may be turned on according to the third voltage VGL2 of a low level, and the voltage of the first node Q2 may drop to a low level due to the turned-on third transistor T23. The seventh transistor T27 having a gate connected to the first node Q2 may be turned on, the second voltage VGL may be transmitted to the output terminal GOUT by the turned-on seventh transistor T27, and an output signal OUT of a low level may be output from the output terminal GOUT. In this case, because output signal OUT drops from a high level to a low level, a low-level voltage of the first node Q2 may further drop due to coupling of the capacitor C2. During a seventh section P27, the low-level voltage Q2_LL of the first node Q2 may be less than the second voltage VGL. During the seventh section P27, the low-level voltage Q2_LL of the first node Q2 may be less than the low-level voltage FQ_LL of the third node FQ, the low-level voltage Q0_LL of the fifth node Q0, and the low-level voltage Q1_LL of the fourth node Q1.

The fifth transistor T25 having a gate connected to the first node Q2 or the fourth node Q1 may be turned on, and the sixth transistor T26 may be turned off. The first voltage VGH of a high level may be transmitted to the second node QB by the turned-on fifth transistor T25, and the eighth transistor T28 may be turned off.

While the voltage VQ2 of the first node Q2 maintains a high-level voltage Q2_HL, the third transistor T23 may be turned off and the voltage VQ2 of the first node Q2 may not be influenced by shaking of the voltage VQ0 of the fifth node Q0.

Figure 19:
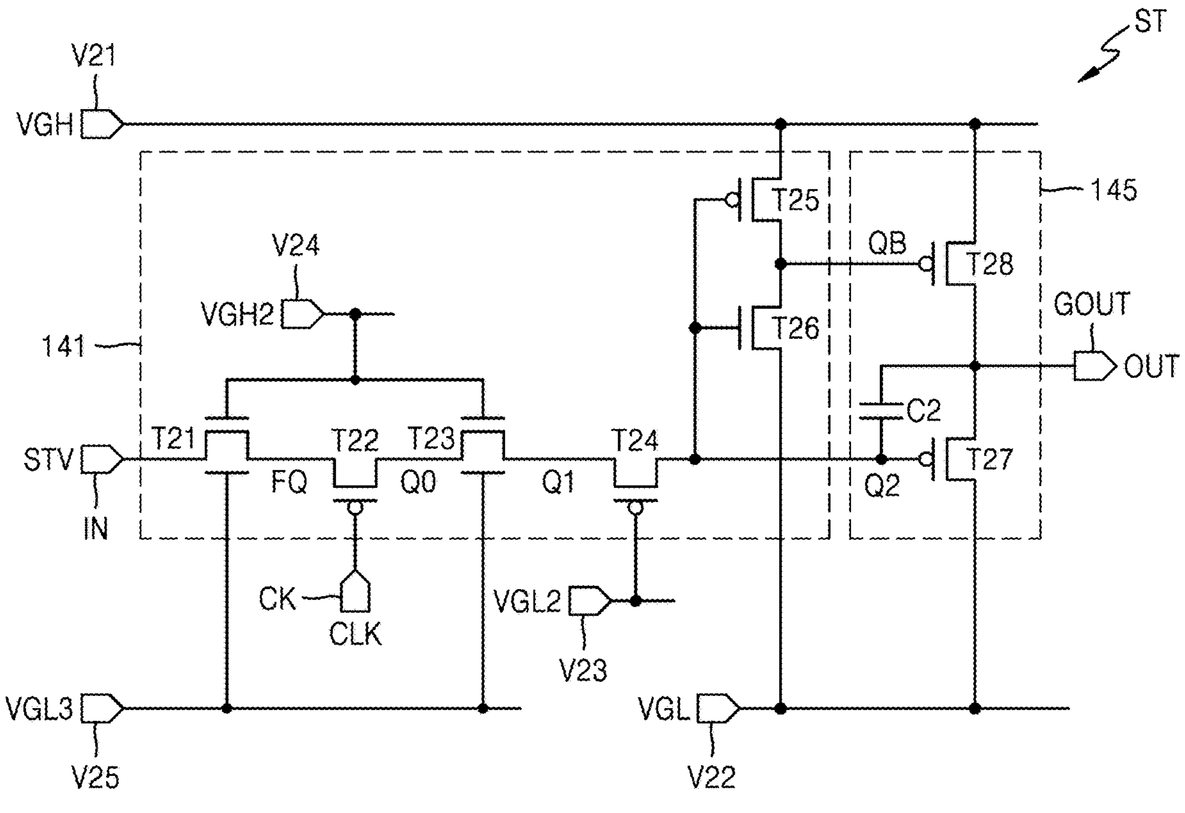
FIGS. 19 to 21 are schematic views of a stage according to an embodiment.
Figure 20:
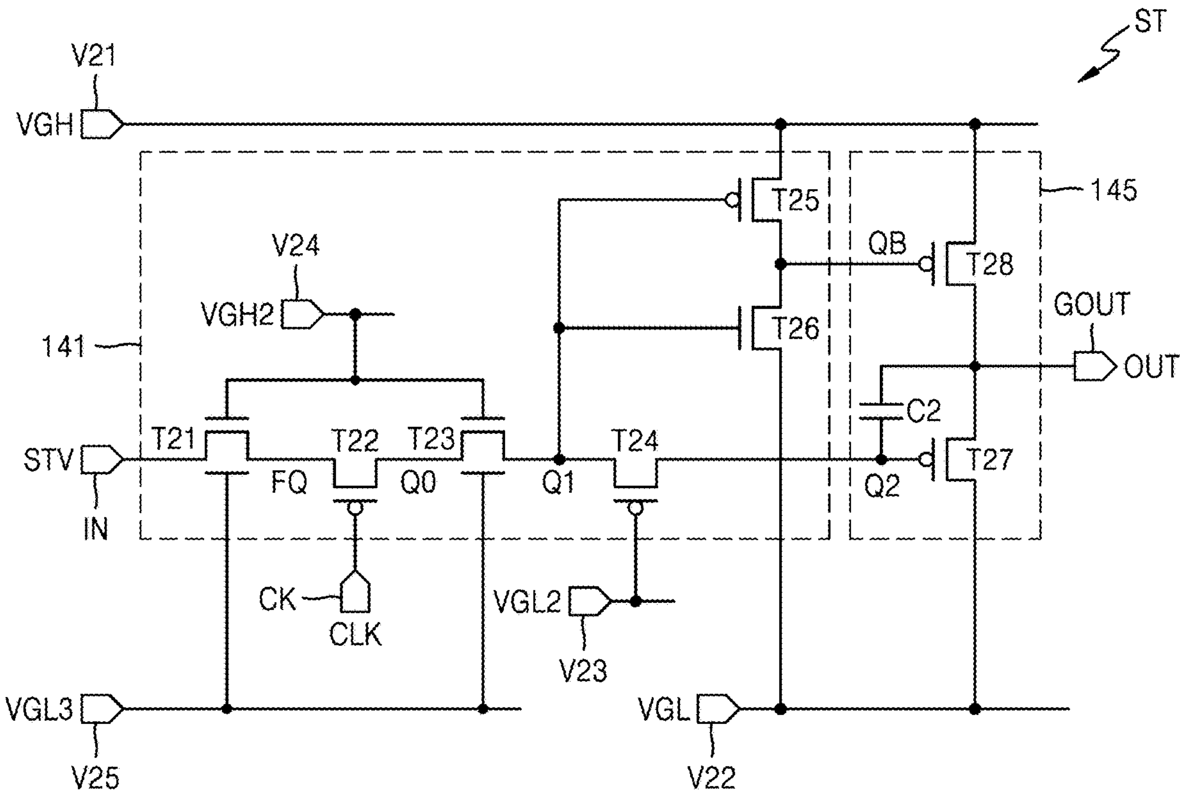
Figure 21:
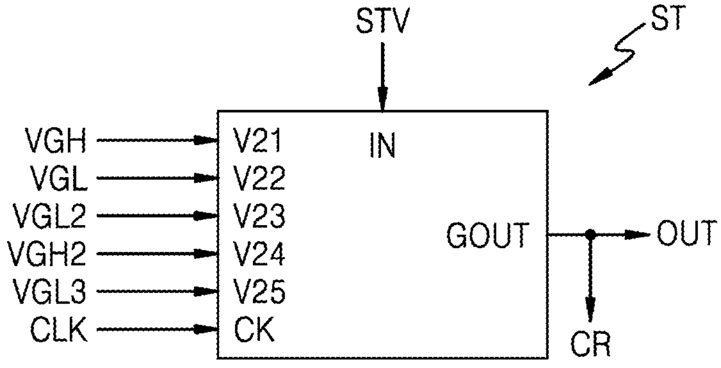

FIGS. 19 to 21 are schematic views of a stage ST according to an embodiment.

The stage ST shown in FIGS. 19 and 20 is different from the stage ST shown in FIGS. 16 and 17 in that the fourth voltage VGL3 is input to the back gate of the first transistor T21 and the third transistor T23. The other configuration and operation of the stage ST shown in FIGS. 19 and 20 are the same as the configuration and operation of the stage ST shown in FIGS. 16 and 17.

In an embodiment, as shown in FIG. 21, the stage ST may further include a fifth voltage input terminal V25 to which the fourth voltage VGL3 is input. The first transistor T21 and the third transistor T23 may be a dual-gate transistor further including a back gate connected to the fifth voltage input terminal V25. A gate of each of the first transistor T21 and the third transistor T23 may be a top gate, and a back gate may be a bottom gate disposed below the semiconductor.

The fourth voltage VGL3 may be less than the third voltage VGL2. A difference between the fourth voltage VGL3 and the third voltage VGL2 may be about 3 V, and the fourth voltage VGL3 may be about −10 V. However, the embodiment is not limited thereto. A difference between the fourth voltage VGL3 and the third voltage VGL2 may be determined by the amount of change in the threshold voltage of the first transistor T21 and the third transistor T23. The fourth voltage VGL3 may be denoted by a low-level voltage.

Figure 22:
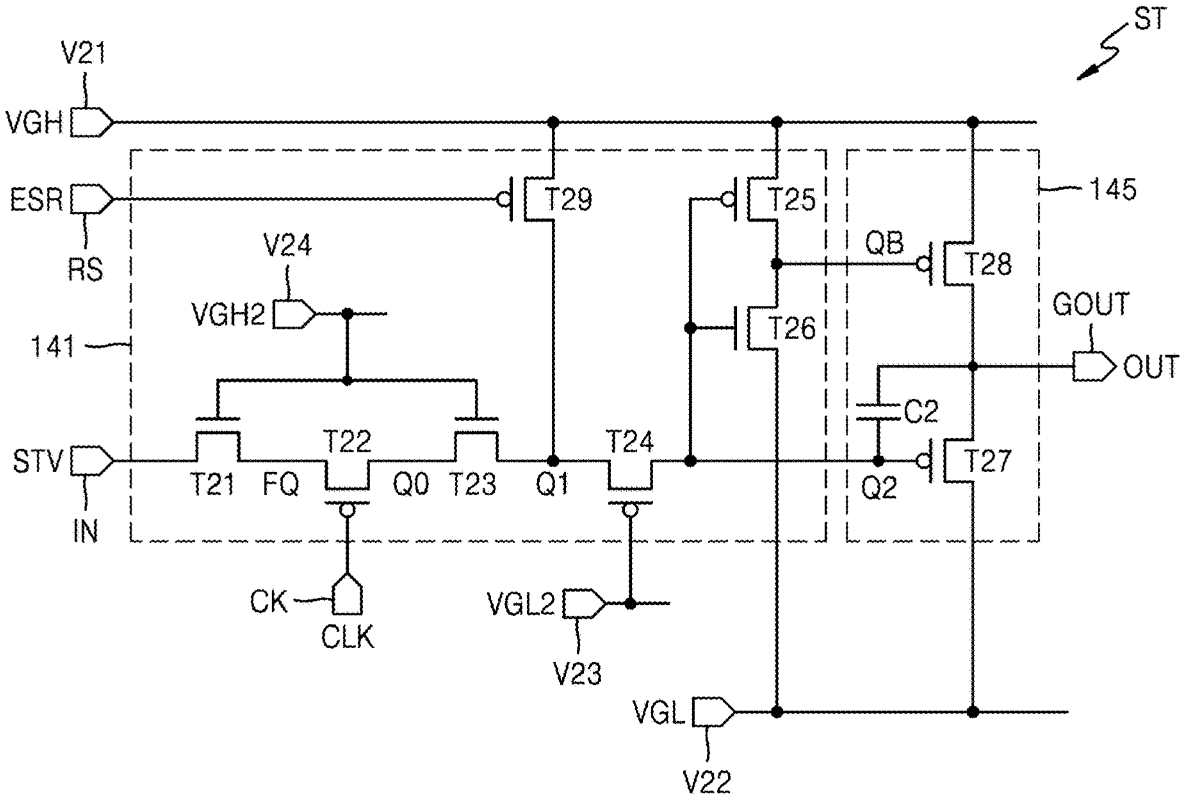
FIGS. 22 to 24 are schematic views of a stage according to an embodiment.
Figure 23:
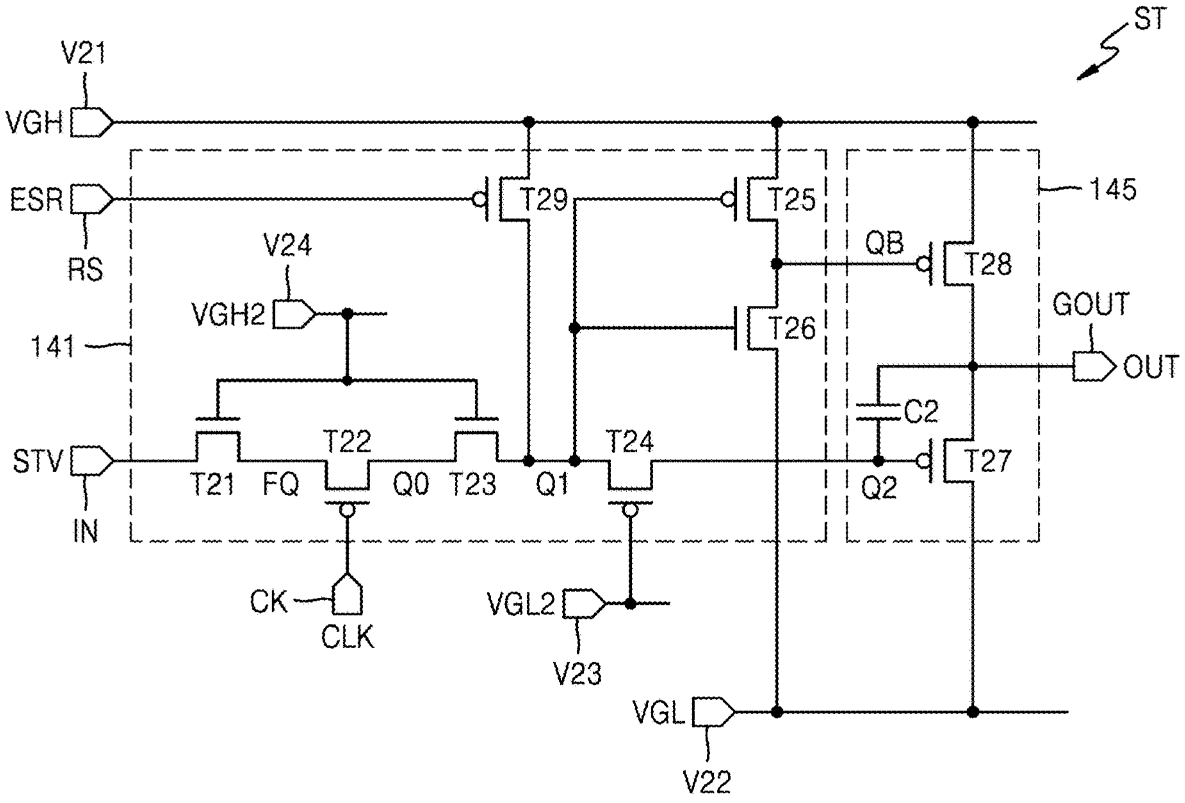
Figure 24:
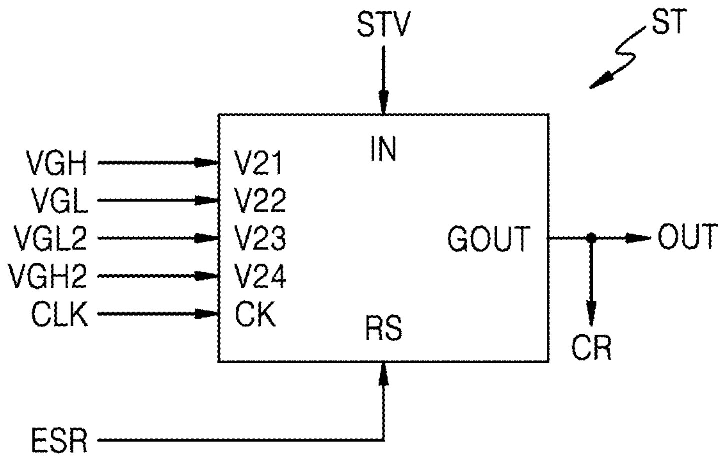

FIGS. 22 to 24 are schematic views of a stage ST according to an embodiment.

The stage ST shown in FIGS. 22 and 24 is different from the stage ST shown in FIGS. 16 and 17 in that it may further includes a ninth transistor T29 as a reset circuit. The other configuration and operation of the stage ST shown in FIGS. 22 and 23 are the same as the configuration and operation of the stage ST shown in FIGS. 16 and 17.

In an embodiment, as shown in FIG. 24, the stage ST may further include a reset terminal RS to which a reset signal ESR is input. The ninth transistor T29 may be configured to reset the fourth node Q1 based on a reset signal ESR supplied to the reset terminal RS. The ninth transistor T29 may be connected between the first voltage input terminal V1 and the fourth node Q1, and a gate of the ninth transistor T29 may be connected to the reset terminal RS. When a reset signal ESR of a low level is applied to the reset terminal RS, the ninth transistor T29 may be turned on to reset the fourth node Q1 to the first voltage VGH. Accordingly, the sixth transistor T26 may be turned on and an output signal OUT of a high level may be output, and an error where the seventh transistor T27 is turned on and an output signal OUT of a low level is output may be prevented.

In an embodiment, when an operation error occurs, a reset signal ESR may be supplied as a low level to the first to n-th stages ST1 to STn at a specific point of time. A reset signal ESR may be supplied at a preset timing as a pulse form having a low level of the second voltage VGL and be supplied at the other timings as the first voltage VGH.

Figure 25:
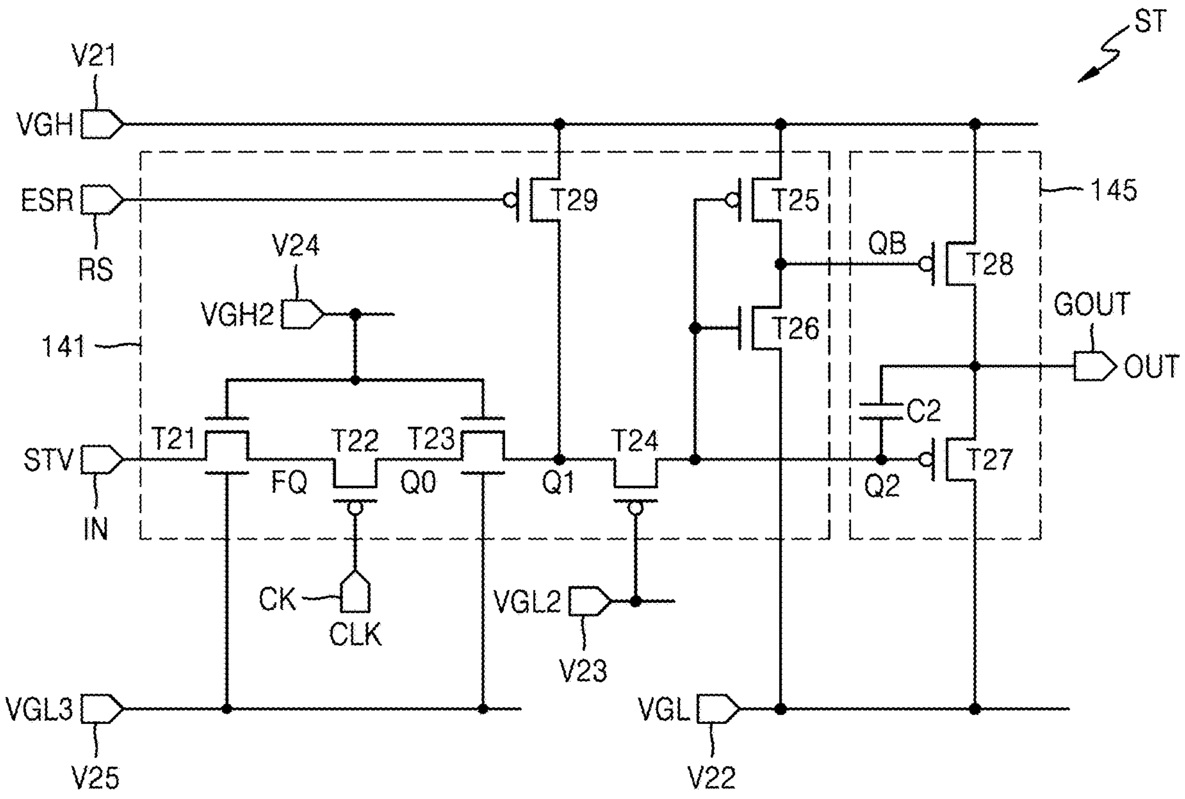
FIGS. 25 to 27 are schematic views of a stage according to an embodiment.
Figure 26:
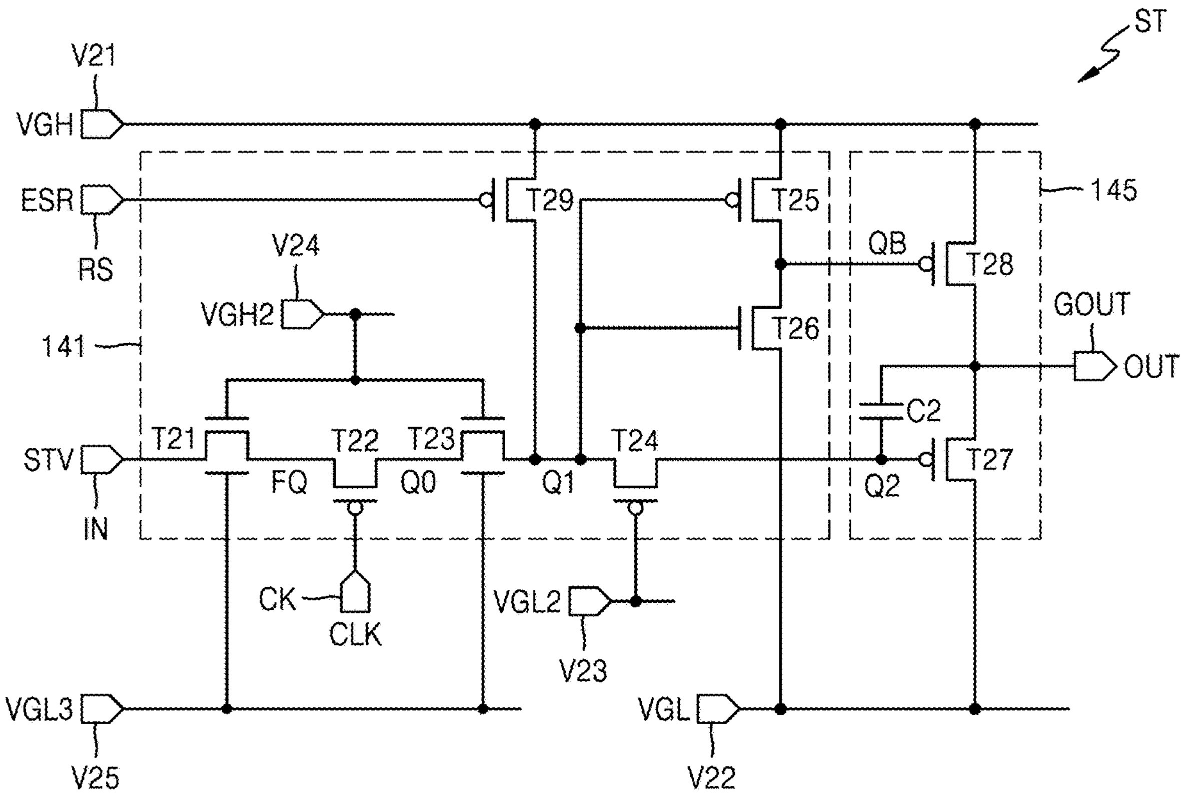
Figure 27:
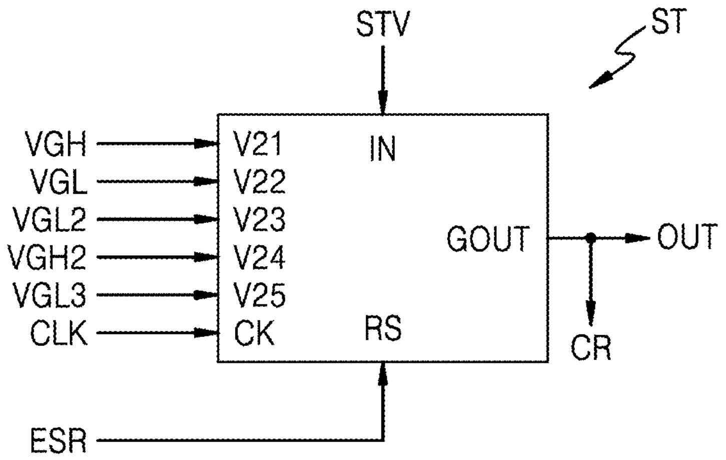

FIGS. 25 to 27 are schematic views of a stage ST according to an embodiment.

The stage ST shown in FIGS. 25 and 26 is different from the stage ST shown in FIGS. 16 and 17 in that the fourth voltage VGL3 is input to the back gate of the first transistor T21 and the third transistor T23, and the ninth transistor T29 as a reset circuit is further included. The other configuration and operation of the stage ST shown in FIGS. 25 and 26 are the same as the configuration and operation of the stage ST shown in FIGS. 16 and 17.

In an embodiment, as shown in FIG. 27, the stage ST may further include the fifth voltage input terminal V25 to which the fourth voltage VGL3 is input and the reset terminal RS to which a reset signal ESR is input. Because the configurations and operations of the first transistor T21, the third transistor T23, and the ninth transistor T29 are described with reference to FIGS. 19 to 24, descriptions thereof are omitted below.

Figure 28:
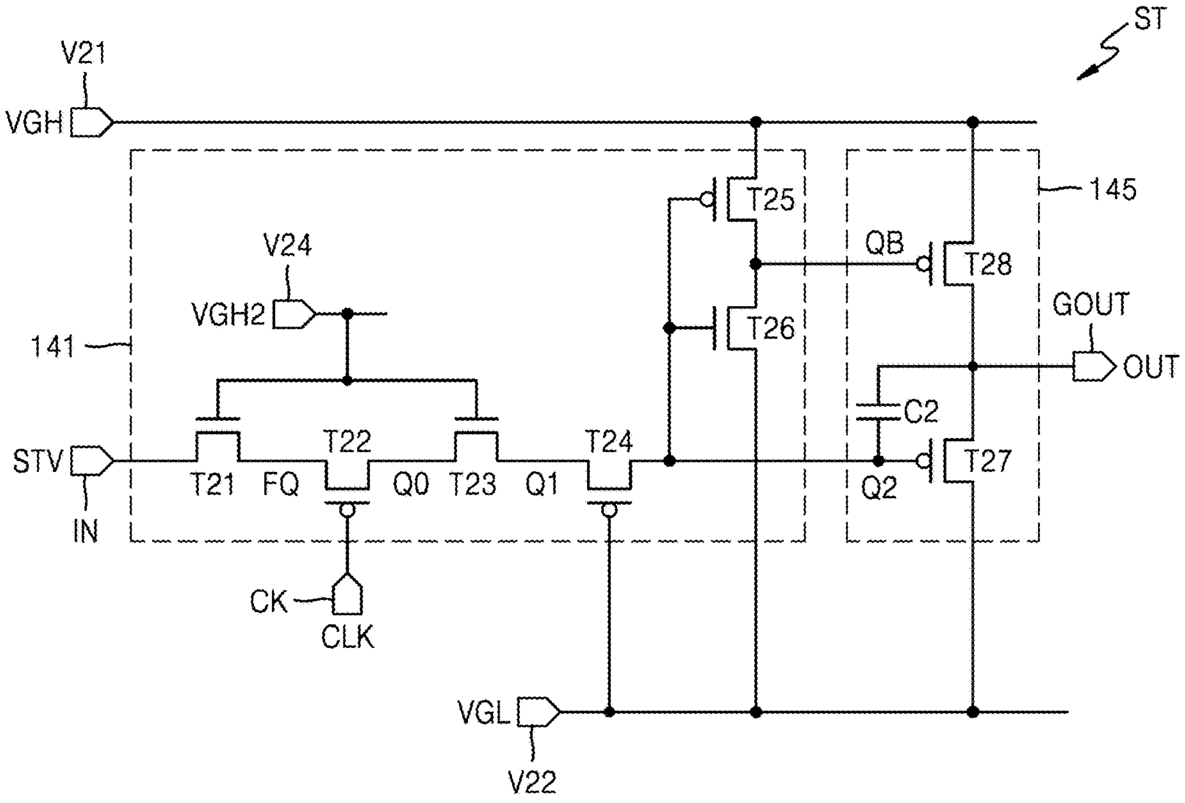
FIGS. 28 to 30 are schematic views of a stage according to an embodiment.
Figure 29:
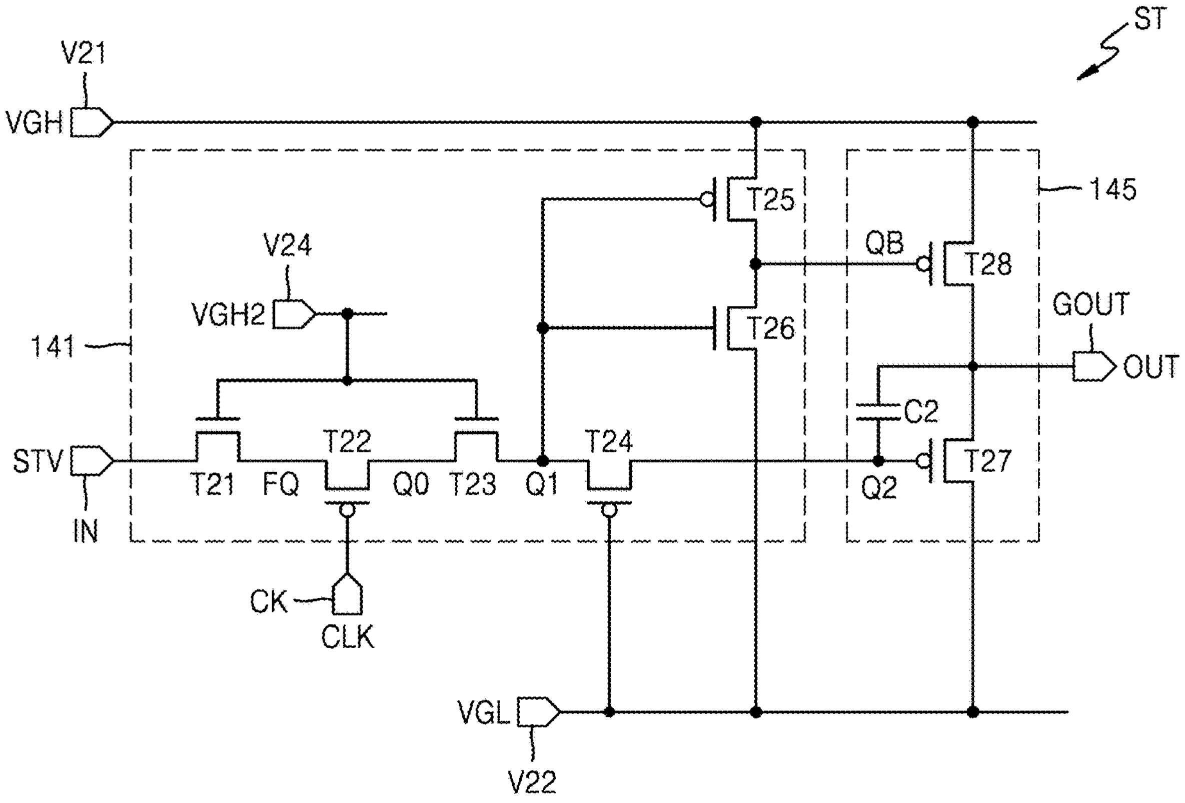
Figure 30:
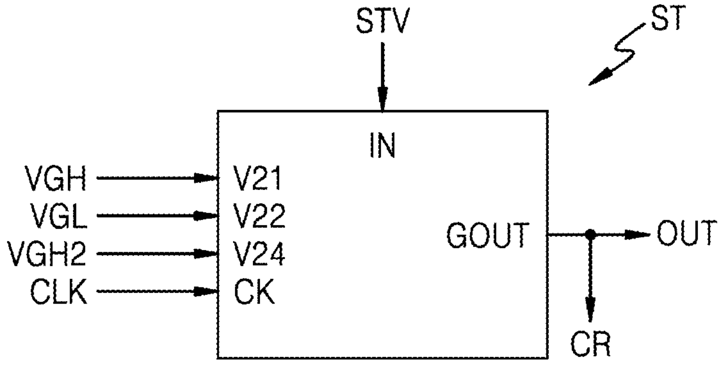

FIGS. 28 to 30 are schematic views of a stage ST according to an embodiment. The stage ST shown in FIGS. 28 and 29 is different from the stage ST shown in FIGS. 16 and 17 in that a second voltage VGL is input to a gate of the fourth transistor T24. The other configuration and operation of the stage ST shown in FIGS. 28 and 29 are the same as the configuration and operation of the stage ST shown in FIGS. 16 and 17.

In an embodiment, the gate of the fourth transistor T24 may be connected to the second voltage input terminal V22, and as shown in FIG. 30, the third voltage input terminal V23 of the stage ST to which the third voltage VGL2 is input may be omitted.

Figure 31:
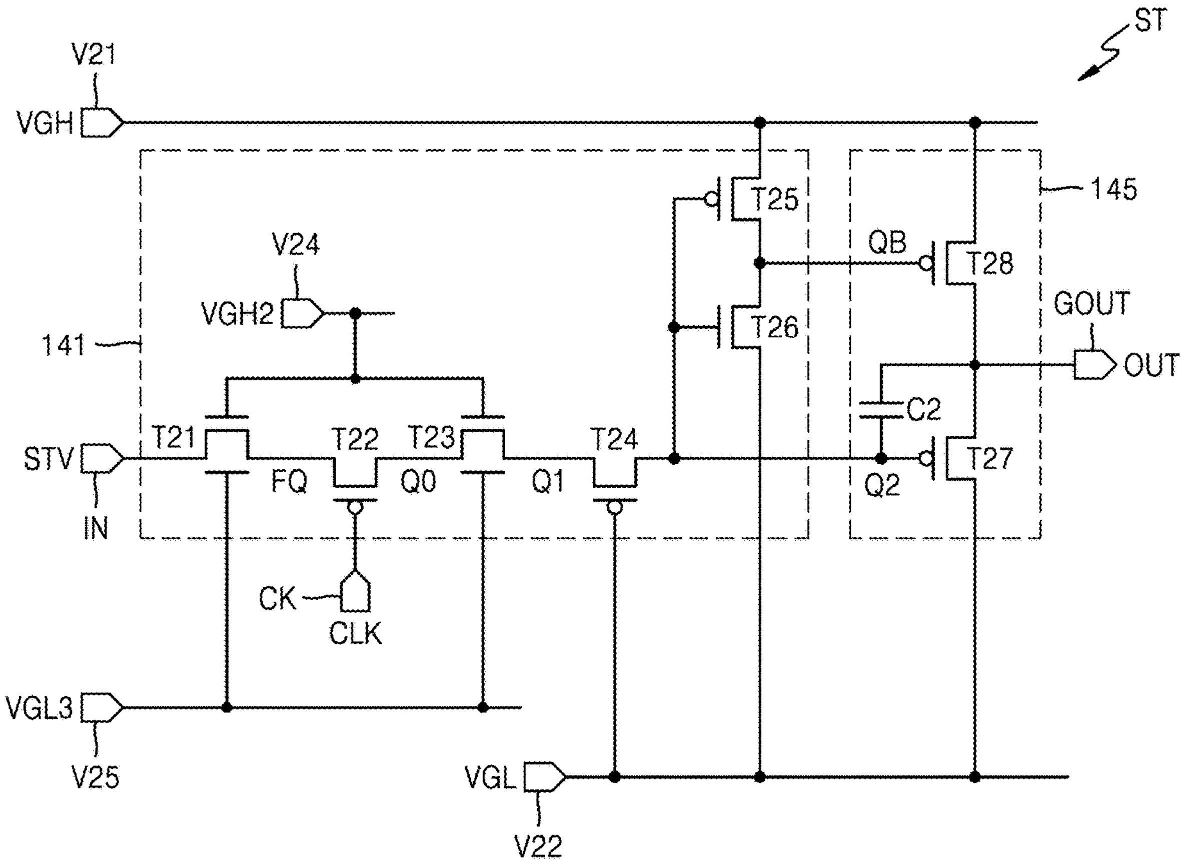
FIGS. 31 to 33 are schematic views of a stage according to an embodiment.
Figure 32:
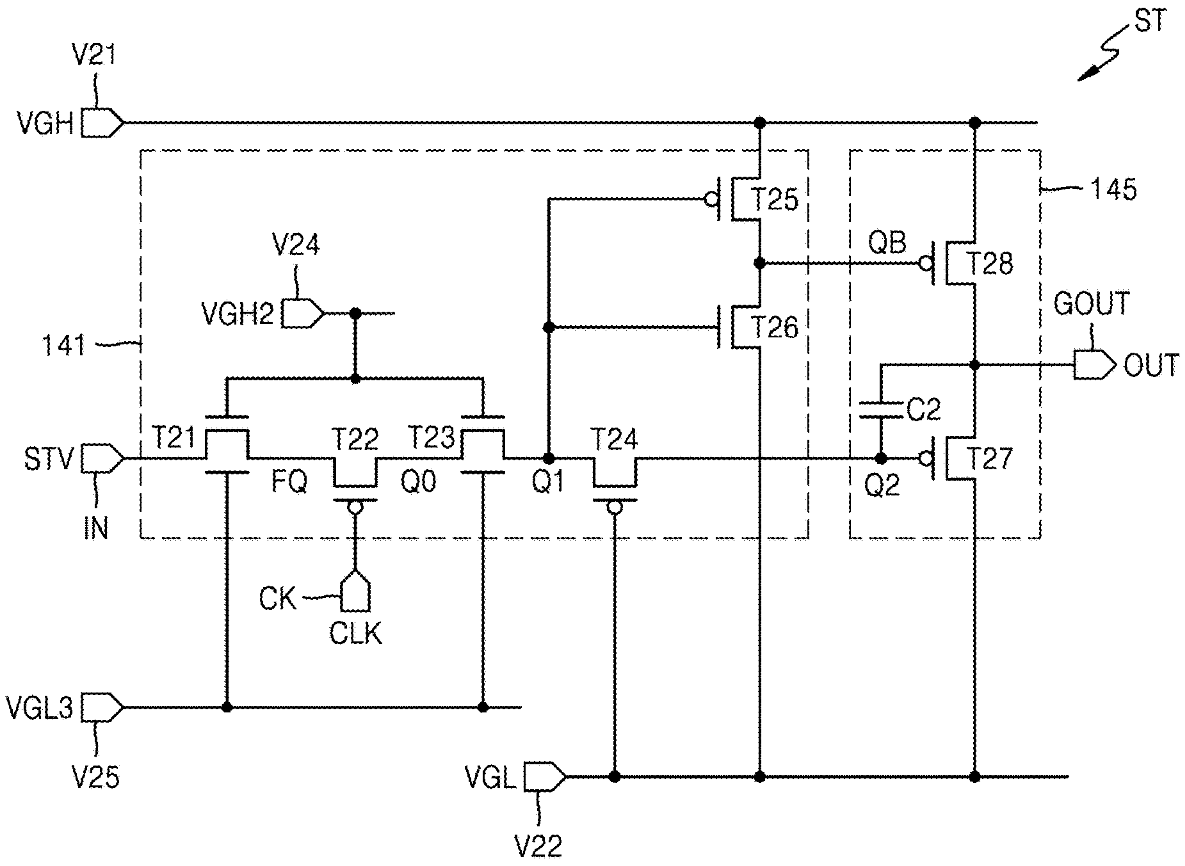
Figure 33:
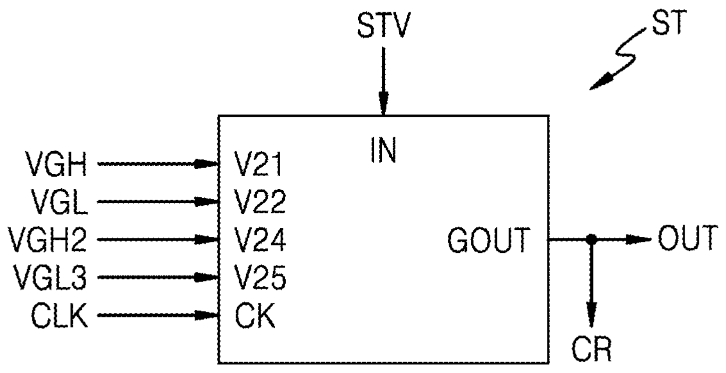

FIGS. 31 to 33 are schematic views of a stage ST according to an embodiment. The stage ST shown in FIGS. 31 to 33 is different from the stage ST shown in FIGS. 19 to 21 in that the third voltage input terminal V23 to which the third voltage VGL2 is input is omitted, and the gate of the fourth transistor T24 is connected to the second voltage input terminal V22 and receives the second voltage VGL. The other configuration and operation of the stage ST shown in FIGS. 31 to 33 are the same as the configuration and operation of the stage ST shown in FIGS. 19 to 21.

Figure 34:
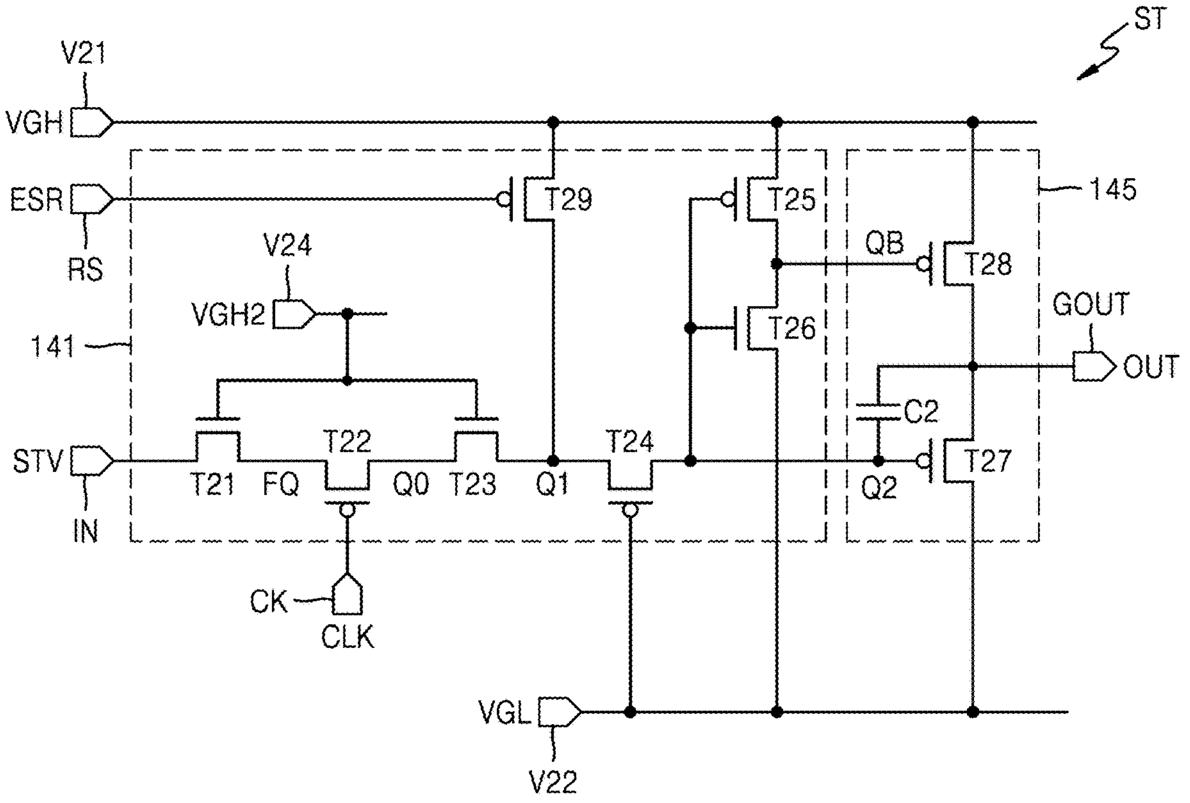
FIGS. 34 to 36 are schematic views of a stage according to an embodiment.
Figure 35:
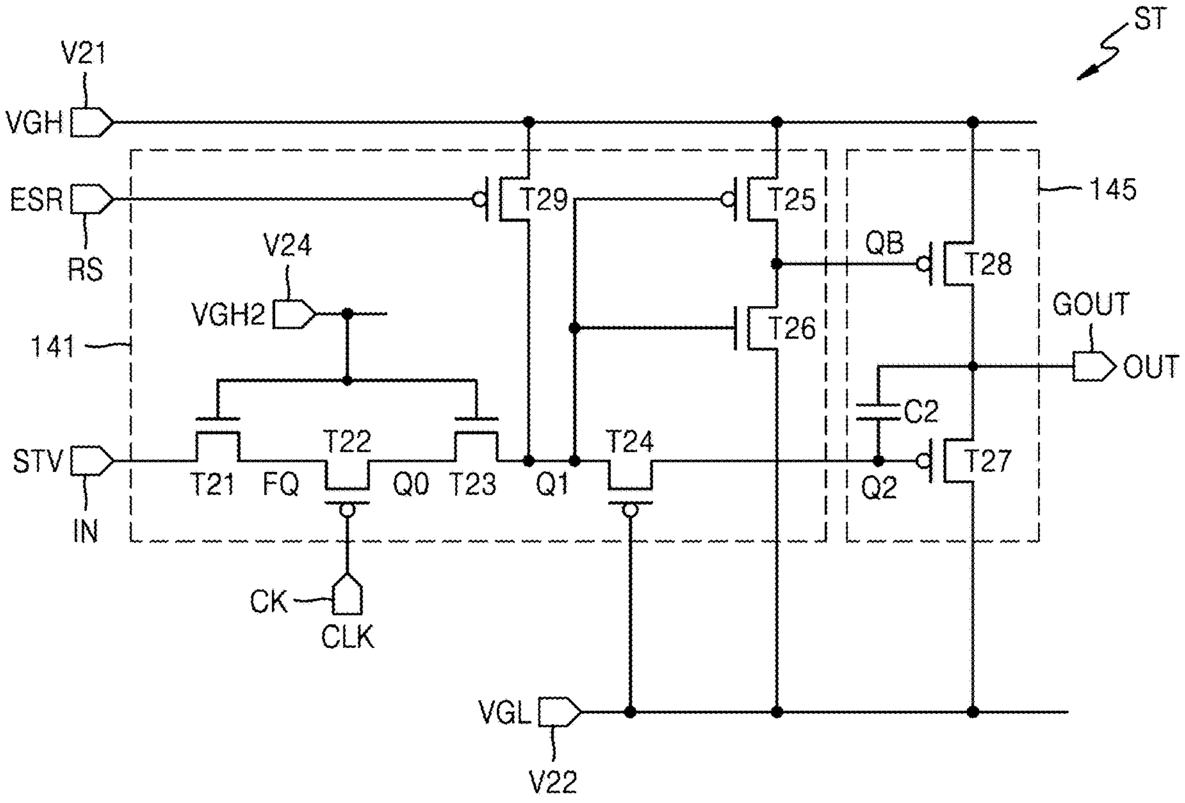
Figure 36:
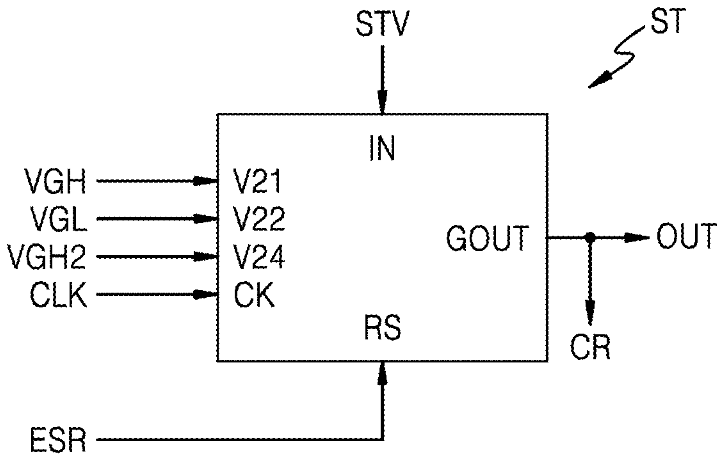

FIGS. 34 to 36 are schematic views of a stage ST according to an embodiment. The stage ST shown in FIGS. 34 to 36 is different from the stage ST shown in FIGS. 22 to 24 in that the third voltage input terminal V23 to which the third voltage VGL2 is input is omitted, and the gate of the fourth transistor T24 is connected to the second voltage input terminal V22 and receives the second voltage VGL2. The other configuration and operation of the stage ST shown in FIGS. 34 to 36 are the same as the configuration and operation of the stage ST shown in FIGS. 22 to 24.

Figure 37:
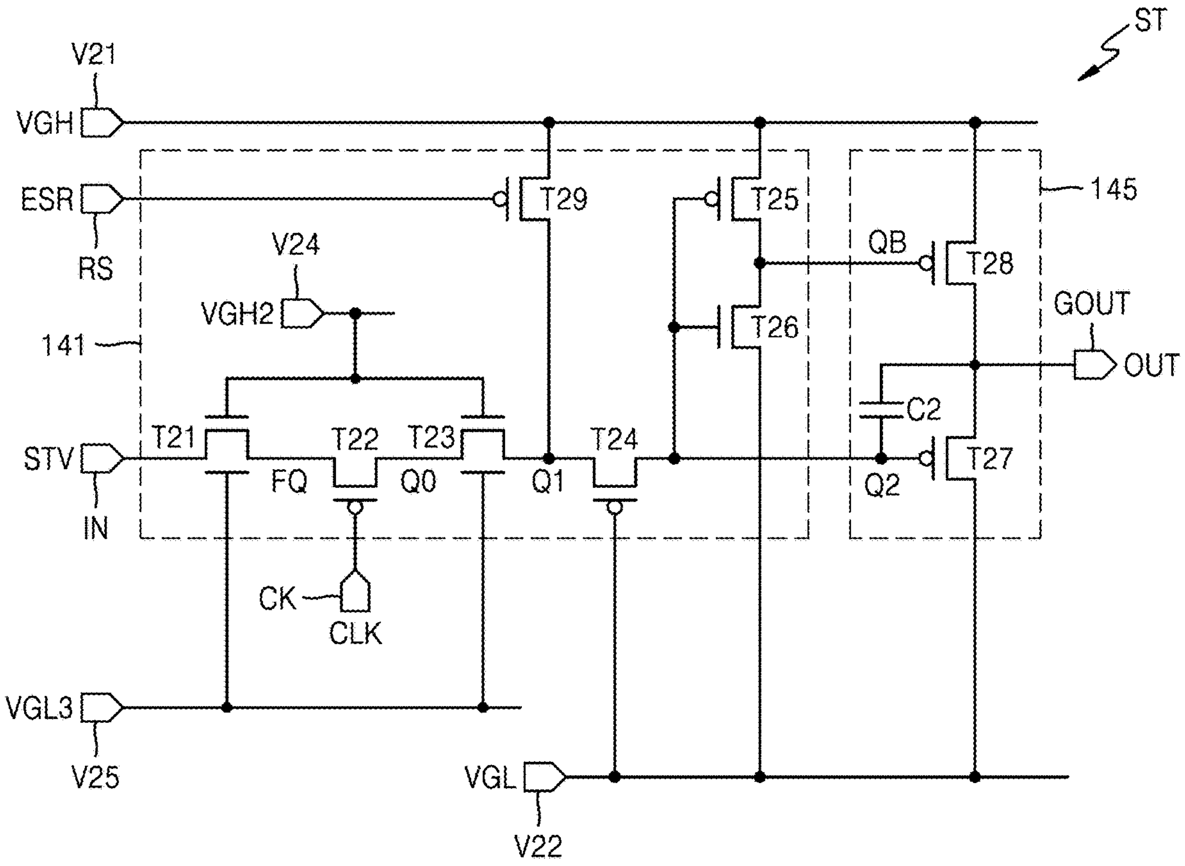
FIGS. 37 to 39 are schematic views of a stage according to an embodiment.
Figure 38:
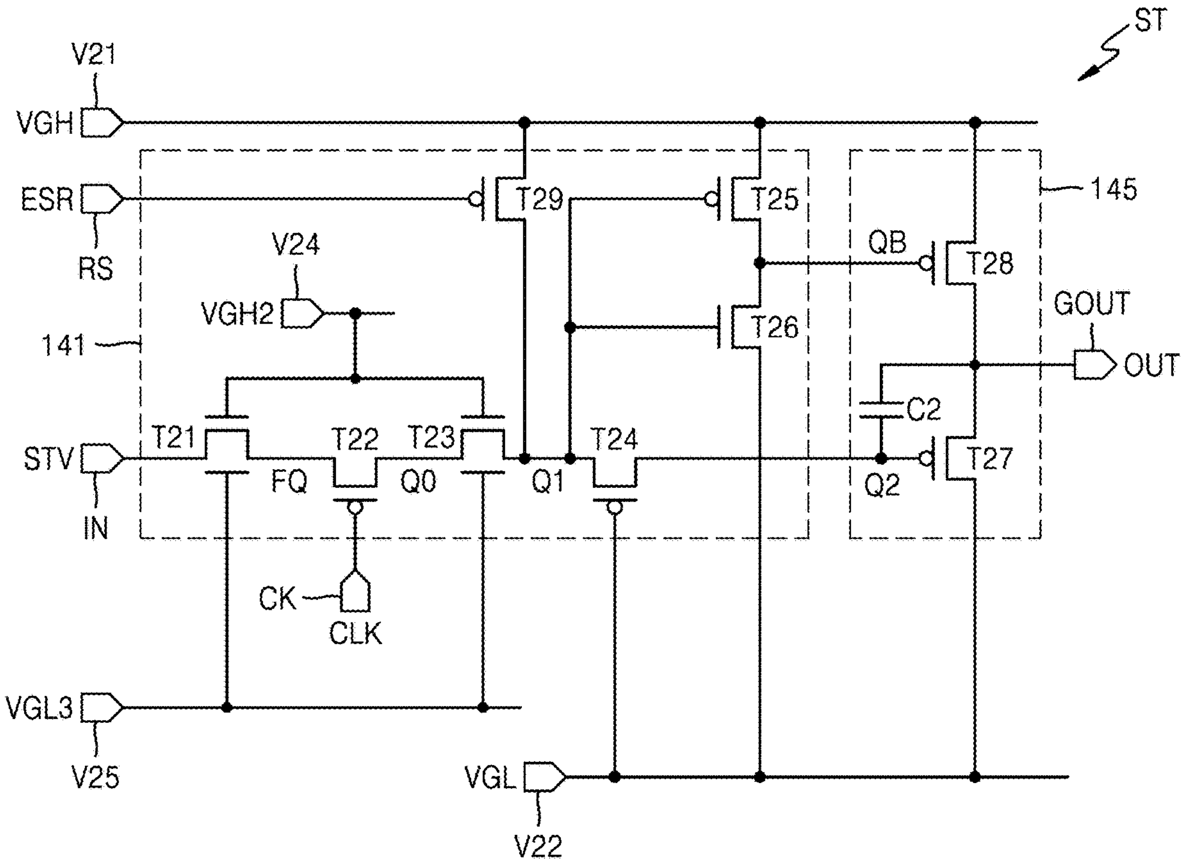
Figure 39:
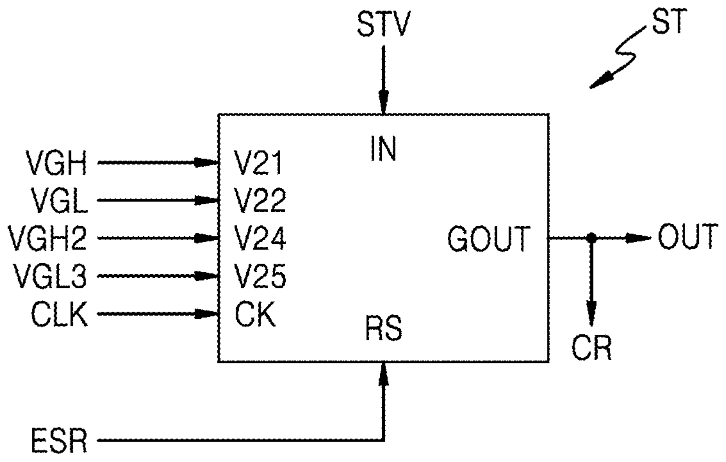

FIGS. 37 to 39 are schematic views of a stage ST according to an embodiment. The stage ST shown in FIGS. 37 to 39 is different from the stage ST shown in FIGS. 25 to 27 in that the third voltage input terminal V23 to which the third voltage VGL2 is input is omitted, and the gate of the fourth transistor T24 is connected to the second voltage input terminal V22 and receives the second voltage VGL. The other configuration and operation of the stage ST shown in FIGS. 37 to 39 are the same as the configuration and operation of the stage ST shown in FIGS. 25 to 27.

Figure 40:
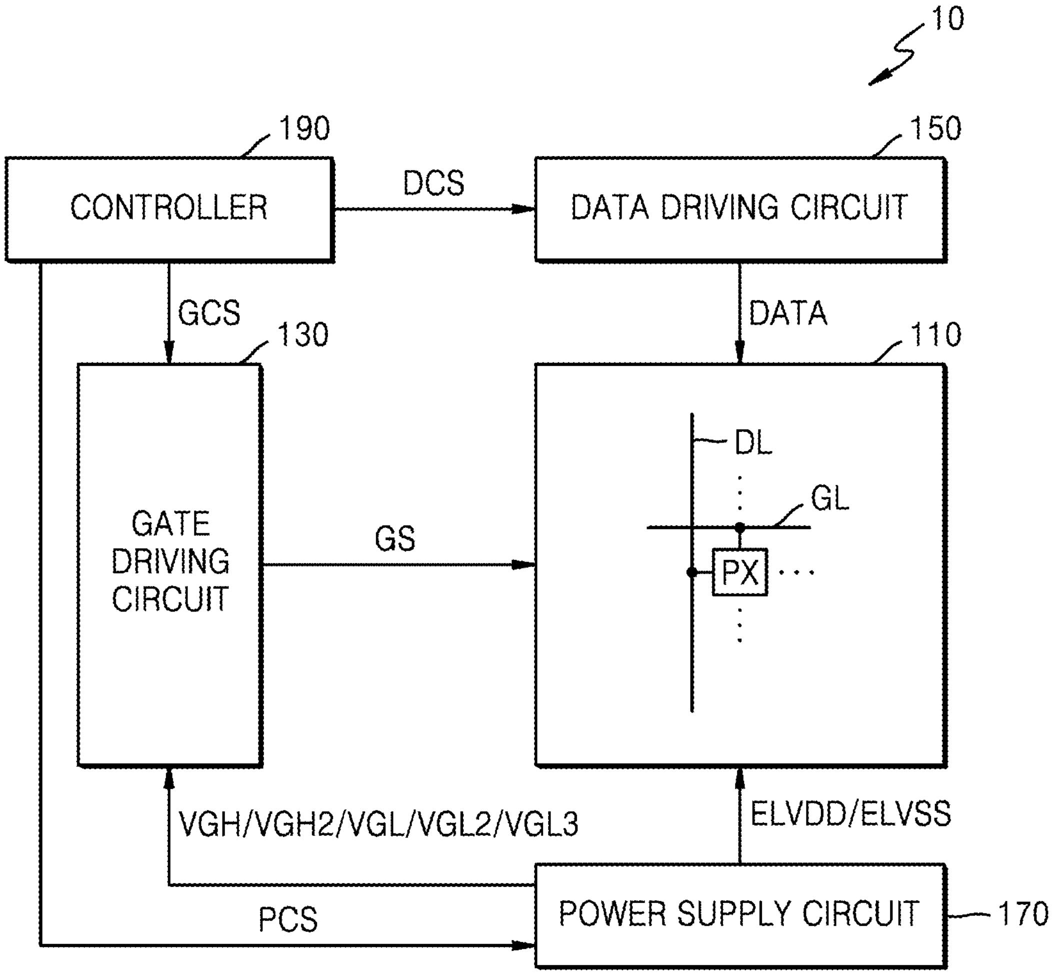
FIG. 40 is a schematic view of a display apparatus according to an embodiment.

FIG. 40 is a schematic view of a display apparatus 10 according to an embodiment.

The display apparatus 10 according to an embodiment may be an organic light-emitting display apparatus, an inorganic light-emitting display apparatus or a quantum-dot light-emitting display apparatus.

Referring to FIG. 40, the display apparatus 10 according to an embodiment may include a pixel area 110, a gate driving circuit 130, a data driving circuit 150, a power supply circuit 170, and a controller 190.

The pixel area 110 may correspond to a display area in which images are displayed. Various conductive lines configured to transmit electrical signals to be applied to a display area, outer driving circuits electrically connected to pixel circuits, and pads to which a printed circuit board or a driver integrated circuit ("IC") chip is attached may be located in a peripheral area (a non-display area) outside the display area. As an example, the gate driving circuit 130, the data driving circuit 150, the power supply circuit 170, and the controller 190 may be provided in the peripheral area.

A plurality of gate lines GL, a plurality of data lines DL, and a plurality of pixels PX connected thereto may be arranged in the pixel area 110. The plurality of pixels PX may be repeatedly arranged in a first direction (an x direction, a row direction) and a second direction (a y direction, a column direction). The plurality of pixels PX may be arranged in various configurations such as a stripe configuration, a Pentile® configuration, a diamond configuration, a mosaic configuration, and/or the like to display images. Each of the plurality of pixels PX may include an organic light-emitting diode as a display element. The organic light-emitting diode may be connected to the pixel circuit. The pixel circuit may include a plurality of transistors and at least one capacitor. The pixel PX may be configured to emit, for example, red, green, blue, or white light from an organic light-emitting diode OLED. Each pixel PX may be connected to a corresponding gate line among the plurality of gate lines GL and a corresponding data line among the plurality of data lines DL.

In an embodiment, the plurality of transistors included in the pixel area 110 may be P-channel silicon transistors. In an embodiment, the plurality of transistors included in the pixel circuit may be N-channel oxide transistors. In an embodiment, some of the plurality of transistors included in the pixel circuit may be P-channel silicon transistors, and others may be N-channel oxide transistors.

The gate lines GL may each extend in the x direction (a row direction) and be connected to the pixels PX arranged in the same row. The gate lines GL may each be configured to transmit gate signals to the pixels PX in the same row. The data lines DL may each extend in the y direction (a column direction) and be connected to the pixels PX arranged in the same column. The data lines DL may be configured to transmit data signals to the pixels PX in the same column in synchronization with a gate signal, respectively.

The gate driving circuit 130 may be connected to the plurality of gate lines GL, configured to generate gate signals GS according to gate driving control signals GCS from the controller 190, and sequentially supply the gate signals GS to the gate lines GL. The gate lines GL may be connected to gates of the transistors included in the pixel PX, and a gate signal GS may be a gate control signal of controlling turn-on and turn-off of the transistor to which the gate line is connected. A gate signal GS may include a gate-on voltage by which a transistor may be turned on, and a gate-off voltage by which a transistor may be turned off. The gate driving circuit 130 may include a plurality of stages configured to sequentially generate and output gate signals GS.

In an embodiment, the gate driving circuit 130 may be implemented as the driving circuit DRV including the stage ST shown in FIGS. 1 to 39. As an example, a gate signal GS output by the gate driving circuit 130 to each gate line GL may correspond to an output signal OUT of a high level output by the plurality of stages ST1 to STn of the driving circuit DRV to a signal line. Each of the stages ST1 to STn may be connected to a gate line arranged in a corresponding row of the pixel area 110. Each of the stages ST1 to STn may be configured to generate gate signals GS and output the same to a gate line GL connected thereto. That is, each of the stages ST1 and STn may be configured to supply gate signal GS of a high level to a gate line GL provided to a corresponding row.

The number of stages configuring the gate driving circuit 130 employing the driving circuit DRV may be variously changed depending on the number of rows (horizontal lines) prepared in the pixel area 110.

The data driving circuit 150 may be connected to the plurality of data lines DL and configured to supply data signals DATA to the data lines DL according to data driving control signals DCS from the controller 190. The data signals DATA supplied to the data lines DL may be supplied to the pixels PX to which gate signals are supplied. The data driving circuit 150 may be configured to convert input image data into a data signal DATA of a voltage or current form, wherein the input image data has a grayscale and input from the controller 190.

The power supply circuit 170 may be configured to generate signals (voltages and currents) to drive the pixels PX of the pixel area 110 in response to a power driving control signal PCS from the controller 190. In the case where the display apparatus 10 is an organic light-emitting display apparatus, the power supply circuit 170 may be configured to generate a first power voltage ELVDD and a second power voltage ELVSS and supply the same to the pixels PX. The first power voltage ELVDD may be a high-level voltage provided to one terminal of a driving transistor connected to a first electrode (a pixel electrode or an anode) of an organic light-emitting diode included in each pixel PX. The second power voltage ELVSS may be a low-level voltage provided to a second electrode (an opposite electrode or a cathode) of an organic light-emitting diode connected to the other terminal of the driving transistor. The first power voltage ELVDD and the second power voltage ELVSS may be driving voltages configured to allow the plurality of pixels PX to emit light.

The power supply circuit 170 may be configured to generate the first voltage VGH, the second voltage VGL, the third voltage VGL2, the fourth voltage VGL3, and the fifth voltage VGH2 and supply the same to the gate driving circuit 130. The power supply circuit 170 may be configured to generate clock signals CLK1 and CLK2 in which the third voltage VGL2 and the fifth voltage VGH2 alternate, and an external signal FLM and supply the same to the gate driving circuit 130.

The controller 190 may be configured to generate a gate driving control signal GCS, a data driving control signal DCS, and a power driving control signal PCS based on signals input from the outside. The controller 190 may be configured to supply a gate driving control signal GCS to the gate driving circuit 130, supply a data driving control signal DCS to the data driving circuit 150, and supply a power driving control signal PCS to the power supply circuit 170.

Although the display apparatus 10 of FIG. 40 includes the power supply circuit 170 and the controller 190 independently, the embodiment is not limited thereto. In another embodiment, the power supply circuit 170 may be included in the controller 190.

The display apparatus 10 may include a display panel, and the display panel may include a substrate. The pixels PX may be arranged in the display area of the substrate. A portion or all of the gate driving circuit 130 may be directly formed in the peripheral area of the substrate during a process of forming a transistor configuring a pixel circuit in the display area of the substrate. The data driving circuit 150, the power supply circuit 170, and the controller 190 may be formed as separate integrated circuit chips, respectively, or one integrated circuit chip, and disposed on a flexible printed circuit board ("FPCB") electrically connected to a pad arranged on one side of the substrate. In another embodiment, the data driving circuit 150, the power supply circuit 170, and the controller 190 may be directly disposed on the substrate using a chip-on-glass ("COG") or chip-on-plastic ("COP") method.

The driving circuit DRV according to embodiments may be configured to reduce power consumption caused by toggle of a clock signal by making a swing width (amplitude) of a clock signal input to each stage ST less than a swing width (amplitude) of a start signal (or output signal).

The driving circuit DRV according to embodiments may alternately connect P-channel transistors and N-channel transistors in series between an input terminal and the first node Q2 to which a gate of a full-down transistor is connected. Transistors connected between an input terminal and the first node Q2 may include a transistor to which a clock signal is input and transistors connected in series to the transistor to which a clock signal is input. A transistor to which a clock signal is input may be a P-channel transistor or an N-channel transistor. Among transistors connected in series to the transistor to which a clock signal is input, a low-level voltage of a clock signal may be input to a gate of a P-channel transistor, and a high-level voltage of a clock signal may be input to a gate of an N-channel transistor. Accordingly, even though a swing width of a clock signal is small, a normal bootstrap operation of the first node Q2 is allowed, and thus, a stable output due to a full-down transistor is possible.

According to an embodiment, a driving circuit configured to stably output gate signals with reduced power consumption, and a display apparatus including the driving circuit may be provided. Effects of the disclosure are not limited to the above effects but may variously extend without departing from the scope of the disclosure.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. A driving circuit including a plurality of stages, wherein each of the plurality of stages includes:

an output circuit connected between a first terminal to which a first voltage is input and a second terminal to which a second voltage is input, and configured to output an output signal of a first voltage level or a second voltage level according to voltage levels of a first node and a second node; and a control circuit connected to the output circuit and an input terminal to which a start signal is input, and configured to control the voltage levels of the first node and the second node, wherein the control circuit includes:

a first transistor connected between the input terminal and a third node and including a gate connected to a third terminal to which a third voltage is input;

a second transistor connected between the third node and a fourth node and including a gate connected to a clock terminal to which a clock signal is input;

a third transistor connected between the fourth node and the first node and including a gate connected to the third terminal; and an inverter connected between the first terminal and the second terminal and configured to control a voltage of the second node to a voltage level obtained by inverting the voltage level of the first node, wherein the inverter includes:

a fourth transistor connected between the first terminal and the second node and including a gate connected to the first node or the fourth node; and a fifth transistor connected between the second node and the second terminal and including a gate connected to the first node or the fourth node, wherein the fourth transistor is a P-channel transistor, and the fifth transistor is an N-channel transistor.

2. The driving circuit of claim 1, wherein the second voltage is less than the first voltage, and the third voltage is less than the first voltage and greater than the second voltage.

3. The driving circuit of claim 1, wherein the second transistor is an N-channel transistor, and the first transistor and the third transistor are P-channel transistors.

4. The driving circuit of claim 1, wherein the clock signal is a signal of which a high-level voltage less than the first voltage and a low-level voltage greater than the second voltage alternate, and the low-level voltage of the clock signal is the third voltage.

5. The driving circuit of claim 1, wherein a clock signal input to clock terminals of even-numbered stages among the plurality of stages is a signal that is phase-shifted by a ½ cycle compared to a clock signal input to clock terminals of odd-numbered stages.

6. The driving circuit of claim 1, wherein the second transistor further includes a back gate to which a fourth voltage less than the third voltage is input.

7. The driving circuit of claim 1, wherein the output circuit includes:

a sixth transistor connected between the second terminal and an output terminal from which the output signal is output and including a gate connected to the first node;

a seventh transistor connected between the first terminal and the output terminal and including a gate connected to the second node; and a capacitor connected between the first node and the output terminal.

8. The driving circuit of claim 1, wherein each of the plurality of stages further includes an eighth transistor connected between the first terminal and the fourth node and including a gate connected to a reset terminal to which a reset signal is input.

9. A driving circuit including a plurality of stages, wherein each of the plurality of stages includes:

an output circuit connected between a first terminal to which a first voltage is input and a second terminal to which a second voltage is input, and configured to output an output signal of a first voltage level or a second voltage level according to voltage levels of a first node and a second node; and a control circuit connected to the output circuit and an input terminal to which a start signal is input, and configured to control the voltage levels of the first node and the second node, wherein the control circuit includes:

a first transistor connected between the input terminal and a third node and including a gate connected to a third terminal to which a third voltage is input;

a second transistor connected between the third node and a fourth node and including a gate connected to a clock terminal to which a clock signal is input;

a third transistor connected between the fourth node and a fifth node and including a gate connected to the third terminal;

a fourth transistor connected between the fifth node and the first node and including a gate connected to a fourth terminal to which a fourth voltage is input; and an inverter connected between the first terminal and the second terminal and configured to control a voltage of the second node to a voltage level obtained by inverting the voltage level of the first node, wherein the inverter includes:

a fifth transistor connected between the first terminal and the second node and including a gate connected to the first node or the fifth node; and a sixth transistor connected between the second node and the second terminal and including a gate connected to the first node or the fifth node, wherein the fifth transistor is a P-channel transistor, and the sixth transistor is an N-channel transistor.

10. The driving circuit of claim 9, wherein the second voltage is less than the first voltage, the third voltage is less than the first voltage, and the fourth voltage is less than the third voltage and greater than the second voltage.

11. The driving circuit of claim 9, wherein the first transistor and the third transistor are N-channel transistors, and the second transistor and the fourth transistor are P-channel transistors.

12. The driving circuit of claim 9, wherein the clock signal is a signal of which a high-level voltage less than the first voltage and a low-level voltage greater than the second voltage alternate, the high-level voltage of the clock signal is the third voltage, and the low-level voltage of the clock signal is the fourth voltage.

13. The driving circuit of claim 9, wherein a clock signal input to clock terminals of even-numbered stages among the plurality of stages is a signal that is phase-shifted by a ½ cycle compared to a clock signal input to clock terminals of odd-numbered stages.

14. The driving circuit of claim 9, wherein the first transistor and the third transistor further include a back gate to which a fifth voltage less than the fourth voltage is input.

15. The driving circuit of claim 9, wherein the output circuit includes:

a seventh transistor connected between the second terminal and an output terminal from which the output signal is output and including a gate connected to the first node;

an eighth transistor connected between the first terminal and the output terminal and including a gate connected to the second node; and a capacitor connected between the first node and the output terminal.

16. The driving circuit of claim 9, wherein each of the plurality of stages further includes a ninth transistor connected between the first terminal and the fifth node and including a gate connected to a reset terminal to which a reset signal is input.

* * * * *